US009160723B2

(12) United States Patent
Yao et al.

(10) Patent No.: US 9,160,723 B2
(45) Date of Patent: Oct. 13, 2015

(54) FRAMEWORK FOR PROVISIONING DEVICES WITH EXTERNALLY ACQUIRED COMPONENT-BASED IDENTITY DATA

(71) Applicant: General Instrument Corporation, Horsham, PA (US)

(72) Inventors: Ting Yao, San Diego, CA (US); Alexander Medvinsky, San Diego, CA (US); Xin Qiu, San Diego, CA (US); Tat Keung Chan, San Diego, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 14/155,170

(22) Filed: Jan. 14, 2014

(65) Prior Publication Data

US 2014/0201518 A1    Jul. 17, 2014

Related U.S. Application Data

(60) Provisional application No. 61/752,054, filed on Jan. 14, 2013.

(51) Int. Cl.
 *H04L 29/06* (2006.01)
 *H04L 9/08* (2006.01)
(52) U.S. Cl.
 CPC ............ *H04L 63/062* (2013.01); *H04L 9/0891* (2013.01)
(58) Field of Classification Search
 CPC ............. H04L 65/60; H04N 21/23439; H04N 21/26258; H04N 21/8456; H04B 10/25751
 USPC .......................................................... 713/155
 See application file for complete search history.

(56) References Cited

U.S. PATENT DOCUMENTS

| | | | |
|---|---|---|---|
| 8,627,083 B2 | 1/2014 | Qiu et al. | |
| 2006/0029107 A1* | 2/2006 | McCullough et al. | 370/527 |
| 2008/0130898 A1* | 6/2008 | Holtmanns et al. | 380/278 |
| 2009/0319672 A1* | 12/2009 | Reisman | 709/227 |
| 2011/0131177 A1* | 6/2011 | Sheth et al. | 707/609 |
| 2011/0138177 A1 | 6/2011 | Qiu et al. | |
| 2011/0258434 A1 | 10/2011 | Qiu et al. | |
| 2011/0258454 A1 | 10/2011 | Qiu et al. | |
| 2011/0258685 A1* | 10/2011 | Qiu et al. | 726/5 |
| 2012/0089839 A1* | 4/2012 | Qiu et al. | 713/171 |

FOREIGN PATENT DOCUMENTS

EP    1881665 A1    1/2008

OTHER PUBLICATIONS

PCT Search Report & Written Opinion, RE: Application #PCT/US2014/011540; dated Aug. 6, 2014.

* cited by examiner

*Primary Examiner* — Kambiz Zand
*Assistant Examiner* — Stephen Sanders
(74) *Attorney, Agent, or Firm* — Thomas A. Ward

(57) ABSTRACT

A method is provided for updating identity data on devices. The method provides for acquiring a device comprising a component associated with a component identifier and having a One Time Programmable Key installed on the component, submitting the component identifier and the One Time Programmable Key to an External Trust Authority, receiving new identity data tied to the component identifier from the External Trust Authority that is encrypted with the One Time Programmable Key, loading the new identity data onto an Update Server, receiving a request at the Update Server from the device that requests new identity data, and providing the new identity data upon receipt of the request, upon which the device decrypts and installs the identity data using the One Time Programmable Key installed on the component within the device.

18 Claims, 11 Drawing Sheets

FRAMEWORK FOR PROVISIONING DEVICES WITH EXTERNALLY ACQUIRED COMPONENT-BASED IDENTITY DATA

CLAIM OF PRIORITY

This application claims priority under 35 U.S.C. §119(e) from earlier filed U.S. Provisional Application Ser. No. 61/752,054, filed Jan. 14, 2013, which is hereby incorporated by reference.

RELATED APPLICATIONS

This application is related to: co-pending U.S. application Ser. No. 13/802,073 filed on Mar. 13, 2013 entitled "Online Personalization Update System for Externally Acquired Keys;" co-pending U.S. application Ser. No. 13/087,843 filed on Apr. 15, 2011, entitled "Cross-Domain Identity Management for a Whitelist-Based Online Secure Device Provisioning Framework;" co-pending U.S. application Ser. No. 13/087,847 filed on Apr. 15, 2011, entitled "Online Secure Device Provisioning Framework;" and U.S. application Ser. No. 13/267,672 filed on Oct. 6, 2011, entitled "Online Secure Device Provisioning Framework," issued as U.S. Pat. No. 8,627,083 on Jan. 7, 2014.

BACKGROUND

1. Technical Field

The present disclosure relates to the field of digital security, particularly digital security for devices in an online identity data update system using externally acquired identity data.

2. Background

The use and transfer of digital information has become important in many areas of life, including commerce, education, government, entertainment and management. In many of these areas, the ability to ensure the privacy, integrity and authenticity of information can be critical. As a result, several digital security mechanisms have been developed to improve security.

One approach to digital security involves provisioning network-enabled devices, such as PCs, mobile phones, routers, media players, set-top boxes and other devices, with identity data. Identity data provisioned on devices can allow the devices to communicate with other the devices in a secure manner. Identity data can include digital keys and/or digital certificates that can describe the identity of a particular device, and/or allow that particular devices to access a service or network. By way of a non-limiting example, digital keys, such as key pairs of public and private keys, as well as digital certificates can be used to identify, authenticate, and/or communicate with a particular device in a Public Key Infrastructure (PKI) system in a secure manner.

Some existing systems allow identity data to be provisioned on devices before and/or after they are deployed in the field. For example, identity data can be incorporated into a device in a factory during or after manufacture of the device, and/or the identity data can be provisioned or updated in a device after the device has left the factory. By way of a non-limiting example, a large scale upgrade of many devices can occur when a network operator desires to replace its Digital Rights Management (DRM) system or when it wants to support other security applications that require the devices to be provisioned with new types of identity data after the devices have been deployed.

However, these existing systems often do not provide for obtaining new identity data for devices from an external trust authority, or do not provide for the external trust authority encrypting the new identity data with keys bound to particular component identifiers tied to individual components within the devices to be upgraded.

SUMMARY

An identity data management system is described herein which provides a flexible framework that can be used to add, upgrade, renew, or supplement identity data that is provisioned in devices that are yet to be deployed in the field, or that have already been deployed in the field. The system architecture can allow device vendors to install identity data on devices prior to shipping the devices and having them deployed on networks, and/or allow network operators to install and update identity data in such devices without after they have been deployed on networks without having to recall them from the end-user. The system architecture can also allow network operators to update expired or expiring digital certificates provisioned in previously deployed network-enabled devices with minimum service disruption. By way of a non-limiting example, a service provider can have acquired 500,000 units of a product that they have delivered to their end user customers, and the service provider can desire to update the identity data in all or a subset, such as 100,000, of those units.

In the flexible framework of the identity data management system described herein, individual devices can comprise an individual component, such as a System on a Chip (SoC) that has a component identifier bound to a One Time Programmable Key (OTP Key) installed on the component. The component identifier and OTP Key bound to the particular component can be submitted to an External Trust Authority, which can generate identity data for the device that incorporates that particular component. The External Trust Authority can encrypt the new identity data for a particular device with the OTP Key bound to the component identifier tied to the component in that particular device.

Binding encrypted identity data to an OTP Key associated with a component identifier can assist in ensuring that only a device, or a particular component within the device, that has access to that component identifier and OTP Key can decrypt and install the newly generated identity data, either at a device factory or over a network. Other devices, or other components within the authorized device, that do not know both the component identifier and OTP Key linked to the identity data can be prevented from accessing or sharing the new identity data with unauthorized parties. Even if other devices or components obtain the encrypted identity data, they can be prevented from decrypted or using it because they do not know the requisite component identifier and/or OTP Key.

The present disclosure includes a method for updating devices with new identity data, the method comprising acquiring a device comprising a component, the component being associated with a component identifier and having a One Time Programmable Key installed on the component, submitting the component identifier and the One Time Programmable Key to an External Trust Authority, receiving new identity data tied to the component identifier from the External Trust Authority, the new identity data being encrypted by the External Trust Authority with the One Time Programmable Key, loading the new identity data onto an Update Server, receiving a request at the Update Server from the device, the request requesting the new identity data, and providing the new identity data to the device upon receipt of the request, upon which the device decrypts and installs the identity data using the One Time Programmable Key installed on the component within the device.

The present disclosure also includes a framework for updating identity data on a device, the framework comprising a Key Generation System configured to generate a One Time Programmable Key, a blackbox server configured to be loaded with the One Time Programmable Key, such that the One Time Programmable Key is available to be installed on a component, a Whitelist Generator and Manager configured to request new identity data from an External Trust Authority by submitting the One Time Programmable Key to the External Trust Authority, receive the new identity data from the External Trust Authority in encrypted form, the new identity data being encrypted with the One Time Programmable Key, and transmit the new identity data to the Key Generation System, and an Update Server configured to receive the new identity data from the Key Generation System after the Key Generation System has validated the new identity data, such that the Update Server is loaded with the new identity data and provides the new identity data to a device that incorporates the component upon receiving a request for the new identity data from the device.

In another embodiment, the present disclosure includes a framework for updating identity data on a device, the framework comprising a Key Collector Server configured to collect a One Time Programmable Key installed onto a component, a Key Generation System configured to receive the One Time Programmable Key from the Key Collector Server, a Whitelist Generator and Manager configured to request new identity data from an External Trust Authority by submitting the One Time Programmable Key to the External Trust Authority, receive the new identity data from the External Trust Authority in encrypted form, the new identity data being encrypted with the One Time Programmable Key, and transmit the new identity data to the Key Generation System, and an Update Server configured to receive the new identity data from the Key Generation System after the Key Generation System has validated the new identity data, such that the Update Server is loaded with the new identity data and provides the new identity data to a device that incorporates the component upon receiving a request for the new identity data from the device.

The present disclosure also includes a method for updating devices with new identity data, the method comprising obtaining a component identifier and a One Time Programmable Key from a Key Collector Server at a component factory, acquiring a device comprising a component, the component being associated with the component identifier and having a One Time Programmable Key installed on the component, generating new identity data tied to the component identifier, encrypting the new identity data with the One Time Programmable Key, loading the new identity data onto an Update Server, receiving a request at the Update Server from the device, the request requesting the new identity data, and providing the new identity data to the device upon receipt of the request, upon which the device decrypts and installs the identity data using the One Time Programmable Key installed on the component within the device.

BRIEF DESCRIPTION OF THE DRAWINGS

Further details of the present invention are explained with the help of the attached drawings in which.

DETAILED DESCRIPTION

Figure 1:
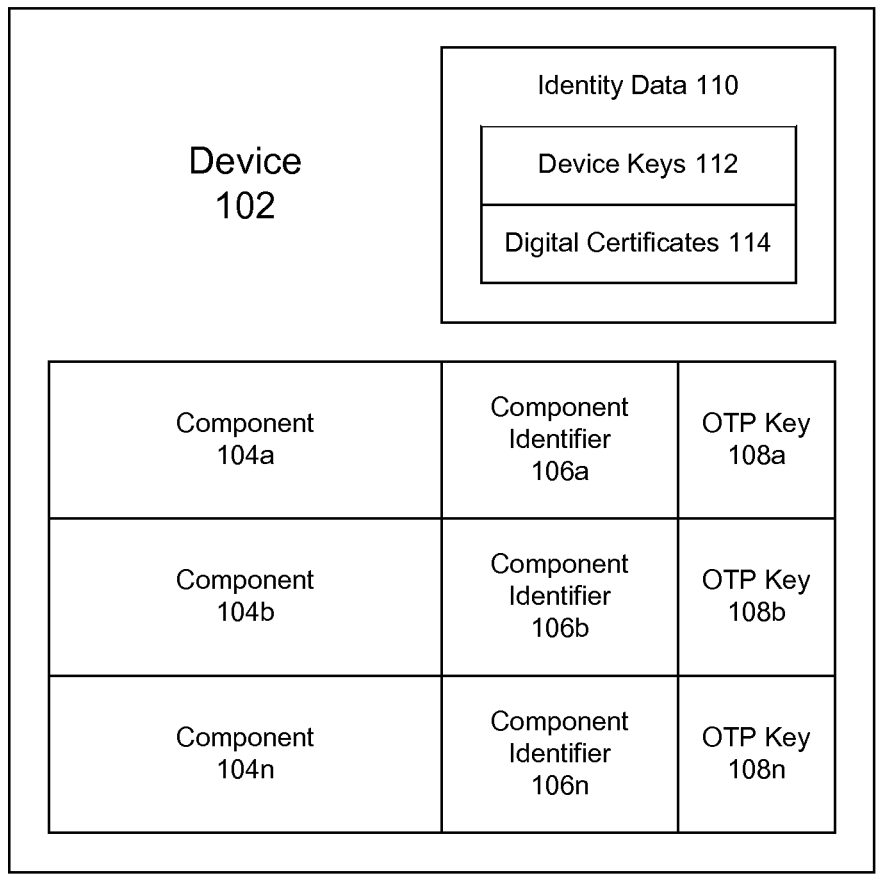
FIG. 1 depicts an exemplary embodiment of device comprising components and having an identity data.

FIG. 1 depicts an exemplary embodiment of a device 102. Devices 102 can be electronic hardware such as set-top boxes, cable boxes, computers, mobile phones, or any other type of device. Devices 102 can comprise one or more components 104. Components 104 can be hardware components that can be assembled into a device 102, such as processors or memory chips. In some embodiments, a component 104 can be a System on a Chip (SoC) that combines components 104 that might otherwise be manufactured separately into a single chip. By way of a non-limiting example, a component 104 can be a SoC that comprises a processor, memory, and other hardware in a single chip.

Individual components 104 can each be designated by a unique component identifier 106. The component identifier 106 can be a number, string of characters, serial number, or any other piece of data that can identify a particular instance of a component 104. By way of a non-limiting example, different SoCs, even of the same type or model, can have different component identifiers 106 such that each individual SoC can be identified through its component identifier 106.

A One Time Programmable Key (OTP Key) 108 can be a digital key that corresponds to a particular component identifier 106. By way of a non-limiting example, a particular OTP Key 108 can be linked to a particular component 104 that is identified by a particular component identifier 106. The OTP Key 108 can be used to encrypt and/or decrypt Identity Data 110, as will be discussed below.

Each device 102 can be provisioned with unique Identity Data 110 that can be used to uniquely identify the device 102, authenticate the device 102, allow communication with the device 102, protect content on the device 102, allow access to the device, and/or permit or disable other types of features on a device 102. By way of a non-limiting example, Identity Data 110 can be used in a Public Key Infrastructure (PKI) system to identify and/or authorize individual devices 102. In some embodiments, Identity Data 110 can comprise one or more digital keys 112. By way of a non-limiting example, digital keys 112 can be a key pair of digital keys that includes a public key and a private key. In other embodiments, Identity Data 110 can comprise both digital keys 112 and digital certificates 114. A digital certificate 114 can be a certificate that includes a digital key 112 and/or a device identifier that uniquely identifies a particular device 102. By way of a non-limiting example, in some embodiments a public key can be included in a digital certificate 114. In some embodiments, a digital certificate 114 can also be signed with a digital signature or credential.

An OTP Key 108 associated with one of the components 104 within a device 102 can be used to encrypt the Identity Data 110 for the device 102. By way of a non-limiting example, one of a device's components 104 can be a SoC, and the OTP Key 108 associated with the SoC can be used to encrypt the device's Identity Data 110.

Figure 2:
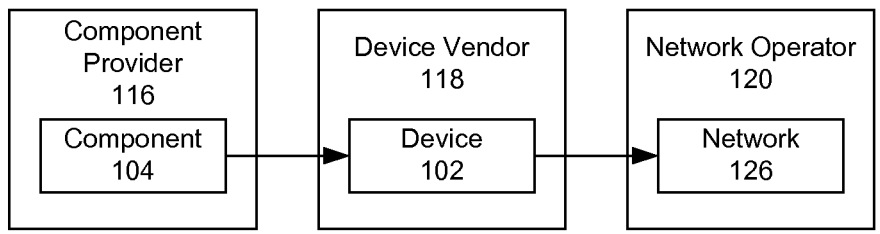
FIG. 2 depicts a diagram of relationships between component providers, device vendors, and network operators.
Figure 3:
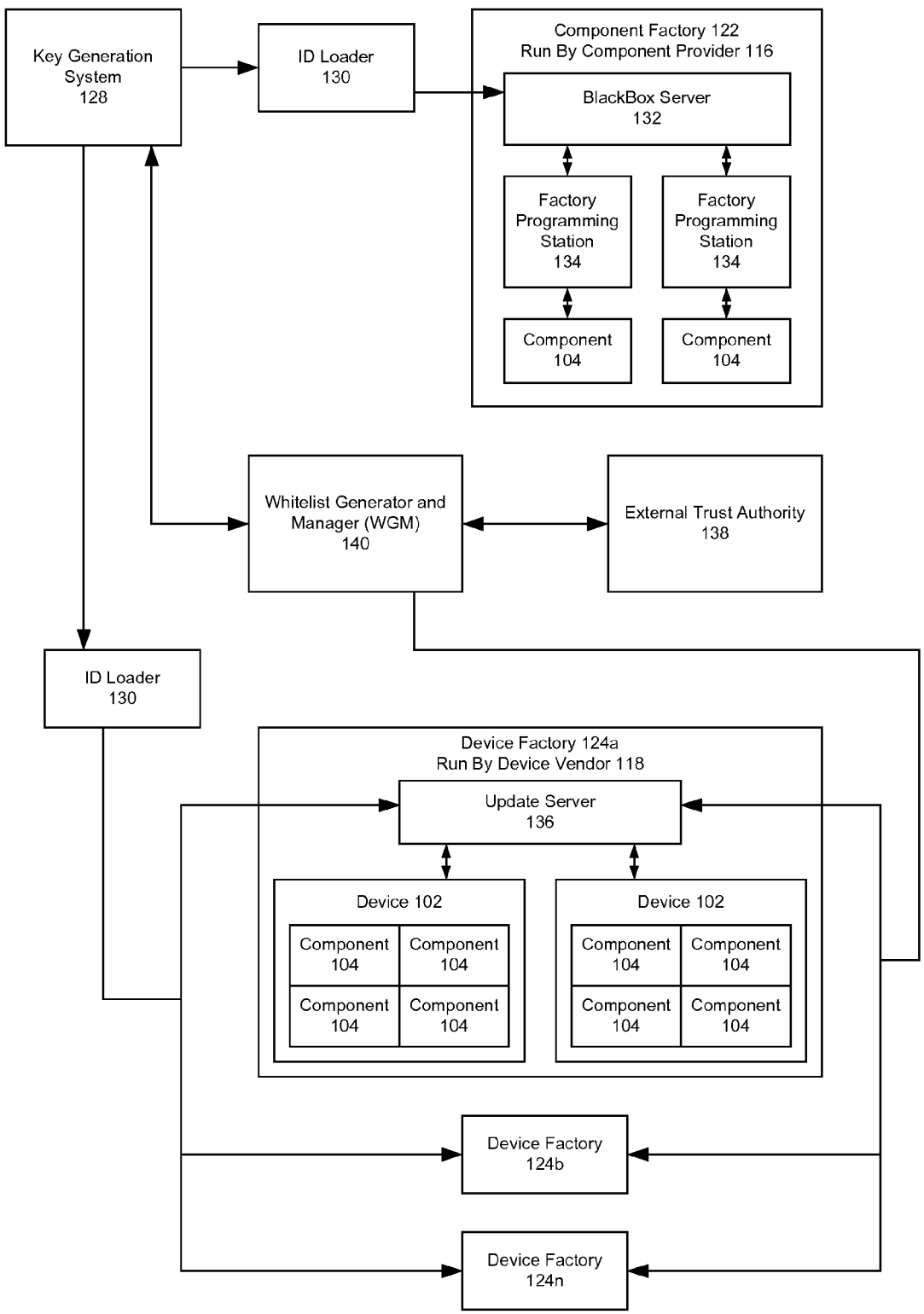
FIG. 3 depicts a first embodiment of an operating environment in which processes for provisioning devices with externally-acquired identity data can be implemented.

FIG. 2 depicts the relationships between component providers 116, device vendors 118, and network operators 120. Component providers 116 can be a manufacturers or resellers of components 104. Component providers 116 can have component factories 122 at which they manufacture the components 104, as shown below in FIGS. 3-12.

Device vendors 118 can be manufacturers and/or sellers of devices 102. Device vendors 118 can obtain individual components 104 from one or more component providers 116, and can assemble the individual components 104 into complete devices 102. Device vendors 118 can have device factories 124 at which they assemble the components 104 into devices 102, as shown below in FIGS. 3-10.

Network operators 120 can be service providers or infrastructure managers that manage networks 126, operate services over networks 126 and/or provide access to networks 126. Devices 102 assembled by the device vendors 118 can be deployed on the networks 126. By way of non-limiting examples, a network operator 120 can be: a cable company that deploys cable boxes on its cable networks; a cellular provider that deploys mobile phones on its telecommunications networks; or any other type of network operator.

A network operator 120 can uniquely identify a particular device 102 on its network by the device's Identity Data 110. Identification of a device 102 by its Identity Data 110 can identify the device 102 on a network 126, allow or restrict the device's access to particular services over the network 126, authenticate the device 102, encrypt data on the device 102, protect content on the device 102, and/or permit or disable other types of features on the device 102. In some situations and/or embodiments, a network operator 120 can desire that a device's Identity Data 110 be bound to a particular component identifier 106 of a component 104 within the device 102. By way of a non-limiting example, a device's Identity Data 110 can be linked to the component identifier 106 of the device's SoC. In these embodiments, the Identity Data 110 can be encrypted with the OTP Key 108 that corresponds to the component identifier 106 of the component 104 linked with the Identity Data 110.

FIGS. 3-10 depict exemplary operating environments of systems for updating devices 102 with new Identity Data 110. In some embodiments and/or situations, devices 102 can be provisioned with new Identity Data 110 before they leave a device factory 124. In other embodiments and/or situations, devices 102 can be provisioned with new Identity Data 110 after they have already been deployed on a network 126.

In these embodiments of the operating environment, a device vendor 118 can operate a Key Generation System 128 that can generate OTP Keys 108 for individual components 104. The device vendor 118 can provide the OTP Keys 108 generated by its Key Generation System 128 to a component provider 116, so that that the component provider 116 can load the OTP Keys 108 onto components 104 at its component factory 122 before the component 104 is provided to the device vendor 118 for assembly into a final device 102. In alternate embodiments, the Key Generation System 128 can be operated by an External Trust Authority 138 or any other entity, and the OTP Keys 108 it generates can be provided to a device vendor 118 and/or component provider 116.

In some embodiments, the Key Generation System 128 can be offline, and the OTP Keys 108 it generates can be provided to other parts of the operating environment through an online ID Loader 130, as described below. In alternate embodiments, the Key Generation System 128 can be online and can be in direct communication with other parts of the operating environment.

An ID Loader 130 can be a software application that can upload OTP Keys 108, Identity Data 110, and/or other data onto a server or other parts of the operating environment. By way of a non-limiting example, an ID Loader 130 can be used to load OTP Keys 108 generated by a Key Generation System 128 onto a server. In some embodiments, an ID Loader 130 can be online and be in data communication with servers or other hardware, while the Key Generation System 128 is kept offline for security or other reasons. In some of these embodiments, OTP Keys 108 generated by the offline Key Generation System 128 can be manually transferred to an online ID Loader 130 via removable media such as a USB flash drive. The online ID Loader 130 can then transfer the OTP Keys 108 to other parts of the system over a secure network. In alternate embodiments, the Key Generation System 128 can be online and in data communication with one or more ID Loaders 130, and/or other parts of the operating environment.

In some embodiments, an ID Loader 130 can upload OTP Keys 108 from the device vendor's Key Generation System 128 to a BlackBox Server 132 located at a component factory 122, such that the OTP Keys 108 can be loaded onto components 104 being made at the component factory 122. A BlackBox server 132 can be a server that stores the OTP Keys 108 received from the ID Loader 130, and can pass the OTP Keys 108 to one or more Factory Programming Stations 134 which can load the OTP Keys 108 onto the components 104 at the component factory 122. In some embodiments, the BlackBox server 132 can be provided to the component provider 116 by the device vendor 118 for use in the component provider's component factories 122. In alternate embodiments, the BlackBox server 132 can be provided by the component provider 116 or any other entity. In some embodiments, the ID Loader 130 can be configured to upload a particular OTP Key 108 a single time to a particular server, such that only one server has the OTP Key 108 and the OTP is only provisioned on one component 104, thereby assisting in avoiding device cloning in which the same OTP Key 108 used in more than one device 102.

In some embodiments, the same or a different ID Loader 130 can upload an Identity Data 110 from the device vendor's Key Generation System 128 to an Update Server 136. As will be described in more detail below, the Identity Data 110 can have originated from an External Trust Authority 138 and have been transmitted to the Key Generation System 128 via a Whitelist Generator and Manager (WGM) 140. In some embodiments, an Update Server 136 can be located at each device factory 124. In alternate embodiments, a central Update Server 136 can be in communication with devices 102 that have been deployed on a network operator's network 126. The Update Server 136 can store Identity Data 110 received from the ID Loader 130, and provide the Identity Data 110 to devices 102 at the device factory 124 or on the network 126 when the devices 102 are to be updated with initial or replacement Identity Data 110.

In some embodiments, the ID Loader 130 can be configured to upload Identity Data 110 to a plurality of Update Servers 136 at various device factories 124, such that each Update server 136 has the complete Identity Data 110 to load onto any device 102 at any device factory 124. By way of a non-limiting example, in some situations it may not be known beforehand which device factory 124 will obtain which specific component 104 from a component provider 116, and so having each Update Server 136 obtain all the Identity Data 110 for all devices 102 can allow each individual Update Server 136 to provision any device 102 that contains any particular components 104 it receives with the Identity Data 110 appropriate for the device 102. Although each Update Server 136 can have the Identity Data 110 for many devices 102, the Identity Data 110 can be encrypted with an OTP Key 108 specific to a component 104 within a particular device 102, thereby allowing the Identity Data 110 to only be provisioned on that particular device 102. The encryption of the Identity Data 110 with an OTP Key 108 can therefore assist in preventing device cloning.

In alternate embodiments, the ID Loader 130 can upload Identity Data 110 to one or more specific Update Servers 136. By way of a non-limiting example, in some situations it can be known that a particular device factory 124 manufactures a particular model of device 102 that is not manufactured in any other device factory 124, and so the ID Loader 130 can upload Identity Data 110 for that model of device 102 to the Update Server 136 for that device factory 124 rather than additionally uploading them to Update Server 136 in other device factories 124 at which they would be extraneous.

The External Trust Authority 138 can be a third party entity that is separate from the component provider 116, device vendor 118, and network operator 120. The External Trust Authority 138 can generate new Identity Data 110 for devices 102 based on a list of component identifiers 106 and OTP Keys 108 received from the WGM 140. The External Trust Authority 138 can be in communication with the WGM 140, such that the list of component identifiers 106 and OTP Keys 108 can be provided to the External Trust Authority 138 from the WGM 140, and the Identity Data 110 generated by the External Trust Authority 138 can be provided to the WGM 140 for use in other parts of the system.

The WGM 140 can be a central repository in communication with the Key Generation System 128, External Trust Authority 138, one or more Update Servers 136, and/or a Network 126. The WGM 140 can provide a list of component identifiers 106 and OTP Keys 108 to the External Trust Authority 138, such that the External Trust Authority 138 can use the list of component identifiers 106 and OTP Keys 108 to respectively generate and encrypt new Identity Data 110. The WGM 140 can receive Identity Data 110 from the External Trust Authority 138, and can then provide the Identity Data 110 to the Key Generation System 128. In some embodiments and/or situations, the WGM 140 can additionally generate, store and/or manage a whitelist of the component identifiers 106 that are associated with Identity Data 110 received from the External Trust Authority 138, and can provide that whitelist to one or more Update Servers 136 that are centrally located or are located at specific device factories 124.

Figure 4:
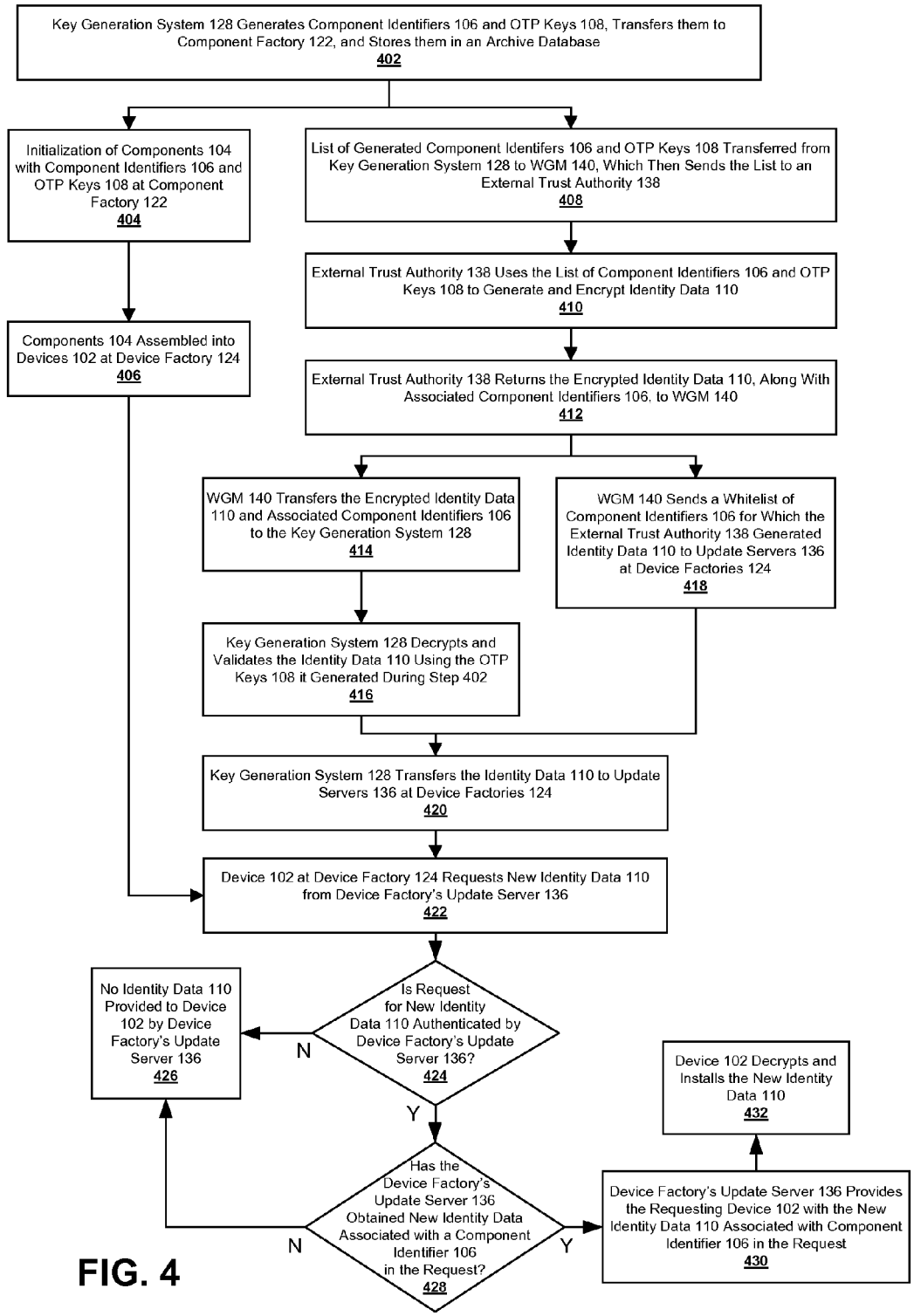
FIG. 4 depicts a flow chart for a first method of obtaining and installing externally-acquired identity data on devices using the operating environment of FIG. 3.
Figure 5:
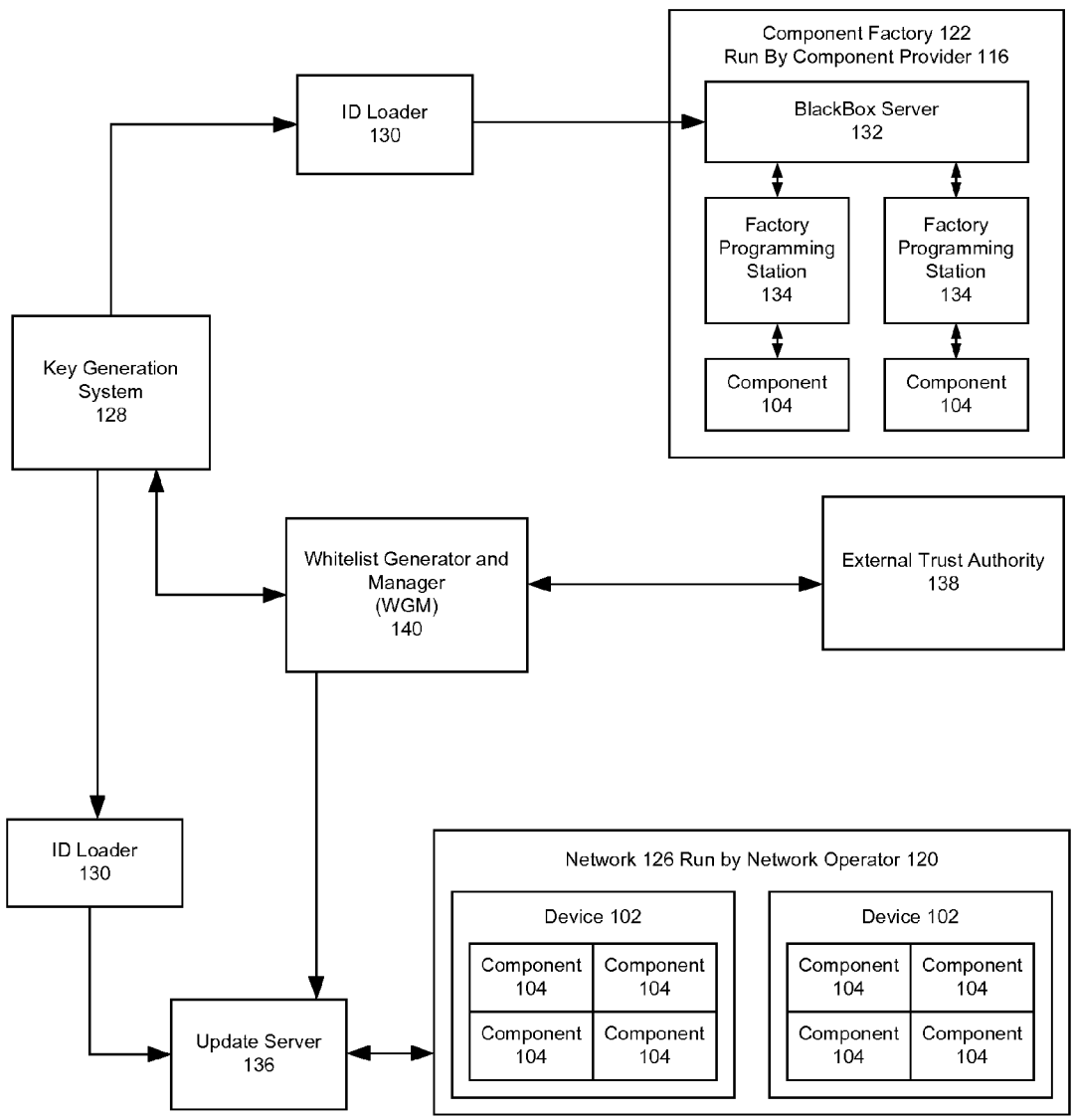
FIG. 5 depicts a second embodiment of an operating environment in which processes for provisioning devices with externally-acquired identity data can be implemented.

FIG. 4 depicts a flow chart for a method of obtaining Identity Data 110 from an External Trust Authority 138 and installing that Identity Data 110 on devices 102 before the devices 102 leave a device factory 124. In this method the components 104 can be designated for a particular network operator 120, and the component identifiers 106 and OTP Keys 108 can be initially generated to be specific to that network operator 120. In some embodiments, the method of FIG. 4 can be used in the operating environment shown in FIG. 3.

At step 402, OTP Keys 108 can be generated at a Key Generation System 128. In some embodiments, the device vendor 118 can own and/or operate the Key Generation System 128. In alternate embodiments, the Key Generation System 128 can be owned and/or operated by an External Trust Authority 138 or any other entity. The OTP Keys 108 generated by the Key Generation System 128 can be in a data type or format specific to a particular network operator 120. By way of a non-limiting example, the device vendor 118 or other entity operating the Key Generation System 128 can know that particular devices 102 are planned to be provided to a particular network operator 120 for deployment on the network operator's network 126, and so the OTP Keys 108 can be generated in a format specific to that network operator 120.

In some embodiments, the Key Generation System 128 can randomly generate OTP Keys 108. The Key Generation System 128 can allocate, generate or be pre-loaded with component identifiers 106 that are not yet associated with any particular components 104. Each randomly generated OTP Key 108 can be paired with or associated with a particular component identifier 106 by the Key Generation System 128. In alternate embodiments, the Key Generation System 128 can generate OTP Keys 108 based on particular component identifiers 106 with which they are associated.

The generated OTP Keys 108 and their associated component identifiers 106 can then be securely delivered via an ID Loader 130 to a BlackBox server 132 located at a component factory 122 operated by a component provider 116, such that they can be loaded onto components 104 at the component factory 122. In some embodiments, the device vendor 118 can have provided the component factory 122 with the BlackBox server 132. In other embodiments, the entity that owns the Key Generation System 128 can have provided the BlackBox server 132 to the component factory 122. The Key Generation System 128 can maintain an archive database of the component identifiers 106 and associated OTP Keys 108 it generates.

At step 404, initialization of components 104 with OTP Keys 108 and component identifiers 106 can be performed at the component factory 122 during manufacturing and/or preparation of the components 104. A Factory Programming Station 134 at the component factory 122 can send a Key Data Request to the BlackBox Server 132, requesting an OTP Key 108 and a component identifier 106 for a particular component 104. The BlackBox Server 132 can provide one of the OTP Keys 108 and associated component identifiers 106 received from the ID Loader 130 to the Factory Programming Station 134, which then associates the component 104 with the component identifier 106 and installs the OTP Key 108 on the component 104. By way of a non-limiting example, a Factory Programming Station 134 can obtain a component identifier 106 and OTP Key 108 for a newly-manufactured SoC from a BlackBox Server 132 at the component factory 122, and then associate the SoC with the component identifier 106 and install the OTP Key 108 on the SoC. Each component 104 can be transferred to a device factory 124 for assembly into a device 102 at step 406.

At 408, a list of component identifiers 106 and their associated OTP Keys 108 generated by the Key Generation System 128 during step 402 can be transferred from the Key Generation System 128 to the WGM 140. In some embodiments in which the Key Generation System 128 is offline, offline files can be transferred from the Key Generation System 128 to the WGM 140 by loading them onto removable media such as a flash drive, CD-ROM, or other media which can be physically transported to and accessed by the WGM 140. In alternate embodiments, the Key Generation System 128 can be online and be in data communication with the WGM 140 directly. The WGM 140 can then submit the list of component identifiers 106 and their associated OTP Keys 108 to an External Trust Authority 138.

At step 410, the External Trust Authority 138 can generate and encrypt new Identity Data 110. In some embodiments, the External Trust Authority 138 can pre-generate one or more new pieces of Identity Data 110, and then link each newly generated piece of Identity Data 110 to one of the component identifiers 106 on the list received from the WGM 140 during step 408. In other embodiments, the External Trust Authority 138 can use the component identifiers 106 on the list received from the WGM 140 during step 408 to generate new Identity Data 110 associated with those component identifiers 106. By way of a non-limiting example, in some embodiments the Identity Data 110 can comprise a digital certificate, and the External Trust Authority 138 can incorporate a component identifier 106 into one of the fields within the digital certificate. After the External Trust Authority 138 generates each piece of Identity Data 110 and links it to a component identifier 106, the External Trust Authority 138 can encrypt the Identity Data 110 with the OTP Key 108 associated with component identifier 106 linked to the Identity Data 110.

At step 412, The External Trust Authority 138 can provide the generated Identity Data 110 and a list of the component identifiers 106 associated with each generated piece of Identity Data 110, to the WGM 140. The WGM 140 can follow steps 414 and/or 418 described below.

At step 414, the WGM 140 can transfer the Identity Data 110 and their associated component identifiers 106 received from the External Trust Authority 138 to the Key Generation System 128. As mentioned above, in some embodiments data transfer between the WGM 140 and Key Generation System 128 can occur through offline methods such as transferring files via a removable flash drive or other physical media, while in alternate embodiments there can be a direct data connection between the WGM 140 and Key Generation System 128.

At step 416, the Key Generation System 128 can validate the Identity Data 110 generated by the External Trust Authority 138 for each component identifier 106 by decrypting the Identity Data 110 using the OTP Key 108 for the component identifier 106 and checking the integrity and cryptographic properties of the decrypted Identity Data 110. By way of non-limiting examples, the Key Generation System 128 can confirm that the Identity Data 110 is not corrupted, that key pairs are valid, and/or perform any other cryptographic operation. The Key Generation System 128 can have maintained a database of OTP Keys 108 and their associated component identifiers generated by the Key Generation System 128 during step 402, such that the OTP Keys 108 in the database can be used to decrypt the Identity Data 110 received from the External Trust Authority 138 through the WGM 140. In some embodiments and/or situations, the Key Generation System 128 can repackage Identity Data 110 into a data format used by a particular type of device 102, while in other embodiments or situations the Key Generation System 128 does not repackage the Identity Data 110.

At step 418, in some embodiments the WGM 140 can forward a whitelist to Update Servers 136 located at device factories 124. The whitelist can contain the component identifiers 106 associated with Identity Data 110 generated by the External Trust Authority 138 during step 410. In some embodiments, at least one Update Server 136 at each device factory 124 can receive the whitelist from the WGM 140, such that the whitelist can be stored and be available locally at each device factory 124 regardless of network conditions. In alternate embodiments, step 418 can be optional and/or absent.

At step 420, the Key Generation System 128 can transfer the encrypted Identity Data 110 received from the WGM 140 during step 414 and validated during step 416, along with their associated component identifiers 106, to the Update Server 136 of each device factory 124 via an ID Loader 130. In some embodiments, at least one Update Server 136 at each device factory 124 can receive the encrypted Identity Data 110 and associated component identifiers 106 from the Key Generation System 128 and/or ID Loader 130, such that the Identity Data 110 and associated component identifiers 106 can be stored and be available locally at each device factory 124 regardless of network conditions. In this embodiment, each Update Server 136 can be loaded with all newly generated Identity Data 110 and associated component identifiers 106, because it can be unknown which device factory 124 will receive which components 104.

In some embodiments, during step 420 the Update Server 136 can additionally verify that it has received newly generated Identity Data 110 from the Key Generation System 128 that is associated with each component identifier 106 on the whitelist of component identifiers 106 received from the WGM 140 during 418. The whitelist sent to the Update Server 136 from the WGM 140 can indicate the component identifiers 106 for which the External Trust Authority generated new Identity Data 110 during step 410, and so the whitelist can be used to confirm that the Update Server 136 has received all expected pieces of newly generated Identity Data 110. However, in alternate embodiments step 418 can be optional or absent such that the Update Server 136 does not receive the whitelist of component identifiers 106 from the WGM 140, and this extra check against the whitelist is not performed.

At step 422, a device 102 being assembled or prepared at a device factory 124 can request Identity Data 110 from an Update Server 136 at the device factory 124. The device 102 can comprise a component 104 previously loaded with a component identifier 106 and OTP Key 108 at a component factory 122 during step 404. The request for Identity Data 110 can contain a component identifier 106 that is linked to one of the generated pieces of Identity Data 110. By way of a non-limiting example, in some embodiments the Identity Data 110 can be linked to the component identifier 106 for the device's SoC, and so the device 102 can include the SoC's component identifier 106 in its request for Identity Data 110.

At step 424, in some embodiments the Update Server 136 can use data in the device's request for new Identity Data 110 regarding previously installed Identity Data 110 to authenticate the request for new Identity Data 110. By way of a non-limiting example, the request for new Identity Data 110 can also include a digital certificate 114 previously installed on the device 102 and a digital signature, which can be used by the Update Server 136 to confirm that the request for new Identity Data 110 came from a device with a valid model number or Stock Keeping Unit (SKU) that is allowed to request Identity Data 110. The Update Server 136 can verify the signature on the digital certificate 114 based on a public key from a trusted Certificate Authority. The public key from the digital certificate 114 can then be used to validate the signature included in the request for new Identity Data 110. If the request for new Identity Data 110 is not authenticated, the request can be rejected at step 426 and no Identity Data 110 is provided to the device 102. If the request for new Identity Data 110 is authenticated, the Update Server 136 can move to step 428. In alternate embodiments, step 424 can be optional and/or absent, and the Update Server 136 can move directly to step 428.

At step 428, the Update Server 136 can receive the device's request for new Identity Data 110 and verify that during step 420 the Update Server 136 received the encrypted Identity Data 110 from the Key Generation System 128 that is associated with the component identifier 106 included in the request sent by the device 102 during step 422. If the Update Server 136 has not obtained Identity Data 110 associated with the component identifier 106 in the device's request, then the request can be rejected at step 426 and no Identity Data 110 is provided to the device 102. If the Update Server 136 has obtained encrypted Identity Data 110 associated with the component identifier 106 in the request, then the Update Server 136 can accept the request, locate the encrypted Identity Data 110 that corresponds to the component identifier 106 it received from the ID Loader 130 during step 420, and provide the encrypted Identity Data 110 to the device 102 at step 430.

In some embodiments, if the Update Server 136 receives multiple requests for Identity Data 110 from a device 102, such as retried requests in the event of a network outage, accidental reset, or any other reason, the Update Server 136 can determine whether a pre-set or dynamic maximum number of retried requests have been received from that device 102 overall or within a pre-set period of time. If the Update Server 136 determines that the device 102 has exceeded the maximum number of allowable retried requests, the Update Server 136 can reject the request even if it has obtained Identity Data 110 corresponding to the component identifier 106 in the device's request. If the Update Server 136 determines that the device 102 has not exceeded the maximum number of retried requests, the Update Server 136 can provide the same encrypted Identity Data 110 to the device 102 again. In alternate embodiments, the Update Server 136 does not check for retried requests and/or does not check the number of retried requests against a pre-set or dynamic limit.

At step 432, the device 102 can decrypt the encrypted Identity Data 110 using the OTP Key 108 loaded onto the component 104 during step 404 that has the component identifier 106 associated with the encrypted Identity Data 110. By way of a non-limiting example, the encrypted Identity Data 110 can be associated with the component identifier 106 for the device's SoC, and so the OTP Key 108 loaded on the SoC can be used to decrypt the encrypted Identity Data 110 associated with the SoC's component identifier 106. The decrypted Identity Data 110 can then be validated and installed on the device 102. In some embodiments, the Identity Data 110 is decrypted only within the component 104 associated with the OTP Key 108, such that that particular component 104 can use the Identity Data 110 for authentication or decryption of message or any other purpose, and the decrypted Identity Data 110 is never transmitted outside of that component 104 or accessible by the device vendor 118 or a component provider 116. In alternate embodiments, the decrypted Identity Data 110 can be used or accessible by any or all parts of a device, and/or can be accessible by third parties.

In some embodiments, the Update Server 136 can periodically delete or purge whitelists and/or Identity Data 110 after a pre-set time interval after the time that they are received during steps 418 and/or 420. By way of a non-limiting example, an Update Server 136 can be set to delete whitelists and/or Identity Data 110 after a pre-set period of time when it is considered less likely that a device 102 will request new Identity Data 110.

Figure 6:
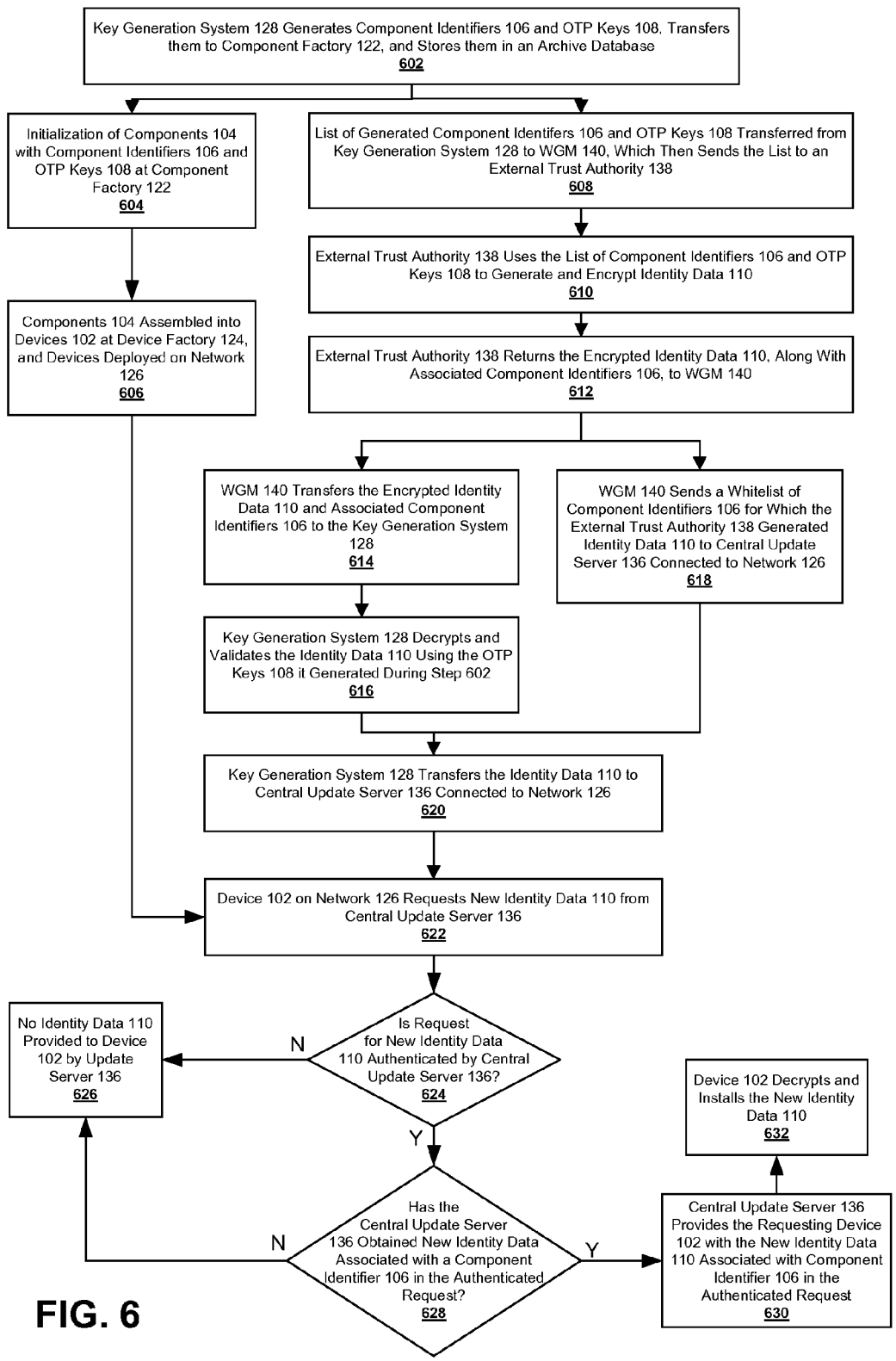
FIG. 6 depicts a flow chart for a second method of obtaining and installing externally-acquired identity data on devices using the operating environment of FIG. 5.
Figure 7:
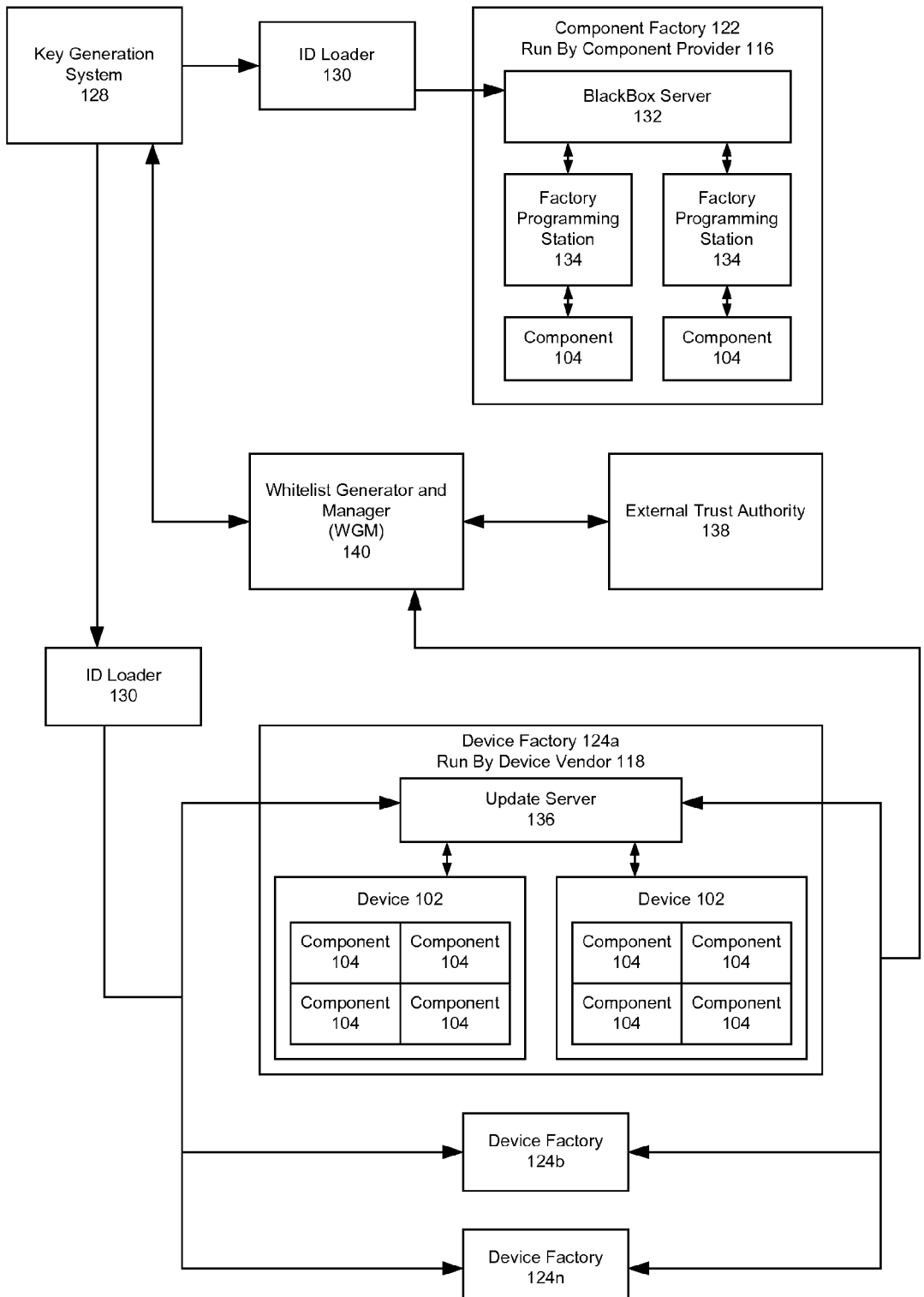
FIG. 7 depicts a third embodiment of an operating environment in which processes for provisioning devices with externally-acquired identity data can be implemented.

FIG. 6 depicts a flow chart for a method of obtaining Identity Data 110 from an External Trust Authority 138 and installing that Identity Data 110 on devices 102 after the devices 102 have been deployed on a network 126 of a particular network operator 120. In this method the components 104 can be designated for the particular network operator 120, and the component identifiers 106 and OTP Keys 108 can be initially generated to be specific to that network operator 120. In some embodiments, the method of FIG. 6 can be used in the operating environment shown in FIG. 5.

At step 602, OTP Keys 108 can be generated at a Key Generation System 128. In some embodiments, the device vendor 118 can own and/or operate the Key Generation System 128. In alternate embodiments, the Key Generation System 128 can be owned and/or operated by an External Trust Authority 138 or any other entity. The OTP Keys 108 generated by the Key Generation System 128 can be in a data type or format specific to a particular network operator 120. By way of a non-limiting example, the device vendor 118 or other entity operating the Key Generation System 128 can know that particular devices 102 are planned to be provided to a particular network operator 120 for deployment on the network operator's network 126, and so the OTP Keys 108 can be generated in a format specific to that network operator 120.

In some embodiments, the Key Generation System 128 can randomly generate OTP Keys 108. The Key Generation System 128 can allocate, generate or be pre-loaded with component identifiers 106 that are not yet associated with any particular components 104. Each randomly generated OTP Key 108 can be paired with or associated with a particular component identifier 106 by the Key Generation System 128. In alternate embodiments, the Key Generation System 128 can generate OTP Keys 108 based on particular component identifiers 106 with which they are associated.

The generated OTP Keys 108 and their associated component identifiers 106 can then be securely delivered via an ID Loader 130 to a BlackBox server 132 located at a component factory 122 operated by a component provider 116, such that they can be loaded onto components 104 at the component factory 122. In some embodiments, the device vendor 118 can have provided the component factory 122 with the BlackBox server 132. In other embodiments, the entity that owns the Key Generation System 128 can have provided the BlackBox server 132 to the component factory 122. The Key Generation System 128 can maintain an archive database of the component identifiers 106 and associated OTP Keys 108 it generates.

At step 604, initialization of components 104 with OTP Keys 108 and component identifiers 106 can be performed at the component factory 122 during manufacturing and/or preparation of the components 104. A Factory Programming Station 134 at the component factory 122 can send a Key Data Request to a BlackBox Server 132, requesting an OTP Key 108 and a component identifier 106 for a particular component 104. The BlackBox Server 132 can provide one of the OTP Keys 108 and associated component identifiers 106 received from the ID Loader 130 to the Factory Programming Station 134, which then associates the component 104 with the component identifier 106 and installs the OTP Key 108 on the component 104. By way of a non-limiting example, a Factory Programming Station 134 can obtain a component identifier 106 and OTP Key 108 for a newly-manufactured SoC from a BlackBox Server 132 at the component factory 122, and then associate the SoC with the component identifier 106 and install the OTP Key 108 on the SoC. Each component 104 can be transferred to a device factory 124 for assembly into a device 102 that can then be deployed on a network 126 operated by a network operator 120 at step 606.

At step 608, a list of component identifiers 106 and their associated OTP Keys 108 generated by the Key Generation System 128 during step 602 can be transferred from the Key Generation System 128 to the WGM 140. In some embodiments in which the Key Generation System 128 is offline, offline files can be transferred from the Key Generation System 128 to the WGM 140 by loading them onto removable media such as a flash drive, CD-ROM, or other media which can be physically transported to and accessed by the WGM 140. In alternate embodiments, the Key Generation System 128 can be online and be in data communication with the WGM 140 directly. The WGM 140 can then submit the list of component identifiers 106 and their associated OTP Keys 108 to an External Trust Authority 138.

At step 610, the External Trust Authority 138 can generate and encrypt new Identity Data 110. In some embodiments, the External Trust Authority 138 can pre-generate one or more new pieces of Identity Data 110, and then link each newly generated piece of Identity Data 110 to one of the component identifiers 106 on the list received from the WGM 140 during step 608. In other embodiments, the External Trust Authority 138 can use the component identifiers 106 on the list received from the WGM 140 during step 608 to generate new Identity Data 110 associated with those component identifiers 106. By way of a non-limiting example, in some embodiments the Identity Data 110 can comprise a digital certificate, and the External Trust Authority 138 can incorporate a component identifier 106 into one of the fields within the digital certificate. After the External Trust Authority 138 generates each piece of Identity Data 110 and links it to a component identifier 106, the External Trust Authority 138 can encrypt the Identity Data 110 with the OTP Key 108 associated with component identifier 106 linked to the Identity Data 110.

At step 612, The External Trust Authority 138 can provide the generated Identity Data 110 and a list of the component identifiers 106 associated with each generated piece of Identity Data 110, to the WGM 140. The WGM 140 can follow steps 614 and/or 618 described below.

At step 614, the WGM 140 can transfer the Identity Data 110 and their associated component identifiers 106 received from the External Trust Authority 138 to the Key Generation System 128. As mentioned above, in some embodiments data transfer between the WGM 140 and Key Generation System 128 can occur methods such as transferring files via a removable flash drive or other physical media, while in alternate embodiments there can be a direct data connection between the WGM 140 and Key Generation System 128.

At step 616, the Key Generation System 128 can validate the Identity Data 110 generated by the External Trust Authority 138 for each component identifier 106 by decrypting the Identity Data 110 using the OTP Key 108 for the component identifier 106 and checking the integrity and cryptographic properties of the decrypted Identity Data 110. By way of non-limiting examples, the Key Generation System 128 can confirm that the Identity Data 110 is not corrupted, that key pairs are valid, and/or perform any other cryptographic operation. The Key Generation System 128 can have maintained a database of OTP Keys 108 and their associated component identifiers generated by the Key Generation System 128 during step 602, such that the OTP Keys 108 in the database can be used to decrypt the Identity Data 110 received from the External Trust Authority 138 through the WGM 140. In some embodiments and/or situations, the Key Generation System 128 can repackage Identity Data 110 into a data format used by a particular type of device 102, while in other embodiments or situations the Key Generation System 128 does not repackage the Identity Data 110.

At step 618, in some embodiments the WGM 140 can forward a whitelist to an Update Server 136 that is in communication with the network 126. The whitelist can contain the component identifiers 106 associated with Identity Data 110 generated by the External Trust Authority 138 during step 610. In alternate embodiments, step 618 can be optional and/or absent.

At step 620, the Key Generation System 128 can transfer, via an ID Loader 130, the encrypted Identity Data 110 received from the WGM 140 during step 614 and validated during step 616, along with their associated component identifiers 106, to an Update Server 136 in communication with a network 126 upon which one or more devices 102 are deployed. In this embodiment, the Update Server 136 can be centralized and loaded with all the newly generated Identity Data 110 and associated component identifiers 106, such that any device 102 on the network 126 can contact the Update Server 136 to request new Identity Data 110.

In some embodiments, during step 620 the Update Server 136 can additionally verify that it has received newly generated Identity Data 110 from the Key Generation System 128 that is associated with each component identifier 106 on the whitelist of component identifiers 106 received from the WGM 140 during step 618. The whitelist sent to the Update Server 136 from the WGM 140 can indicate the component identifiers 106 for which the External Trust Authority generated new Identity Data 110 during step 610, and so the whitelist can be used to confirm that the Update Server 136 has received all expected pieces of newly generated Identity Data 110. However, in alternate embodiments step 618 can be optional or absent such that the Update Server 136 does not receive the whitelist of component identifiers 106 from the WGM 140, and this extra check against the whitelist is not performed.

At step 622, a device 102 on the network 126 can request new Identity Data 110 from the central Update Server 136 that is connected to the network 126. The network operator 120 can authorize a device 102 access the network 126 to request new Identity Data 110 from the Update Server 136. In some embodiments, the device 102 on the network 126 can request new Identity Data 110 to replace Identity Data 110 already installed the device 102, such as Identity Data 110 previously installed at a device factory 124 prior to the device's deployment on the network 126 through a process such as those shown in FIG. 4 or 8.

The device 102 can comprise a component 104 previously loaded with a component identifier 106 and OTP Key 108 at a component factory 122 during step 604. The request for Identity Data 110 can contain a component identifier 106 that is linked to one of the generated pieces of Identity Data 110. By way of a non-limiting example, in some embodiments the Identity Data 110 can be linked to the component identifier 106 for the device's SoC, and so the device 102 can include the SoC's component identifier 106 in its request for Identity Data 110. In this embodiment, in addition to including the component identifier 106, the request for Identity Data 110 can also contain data from Identity Data 110 previously installed on the device 102, such as digital keys 112 and/or digital certificates 114. By way of a non-limiting example, a request for Identity Data 110 can include a digital certificate 114 previously installed on the device 102 and a digital signature, in addition to a component identifier 106.

At step 624, in some embodiments the Update Server 136 can use the data in the device's request for new Identity Data 110 regarding the previously installed Identity Data 110 to authenticate the request for new Identity Data 110. By way of a non-limiting example, the request for new Identity Data 110 can also include a digital certificate 114 previously installed on the device 102 and a digital signature, which can be used by the Update Server 136 to confirm that the request for new Identity Data 110 came from a device with a valid model number or Stock Keeping Unit (SKU) that is allowed to request Identity Data 110. The Update Server 136 can verify the signature on the digital certificate 114 based on a public key from a trusted Certificate Authority. The public key from the digital certificate 114 can then be used to validate the signature included in the request for new Identity Data 110. If the request for new Identity Data 110 is not authenticated, the request can be rejected at step 626 and no Identity Data 110 is provided to the device 102. If the request for new Identity Data 110 is authenticated, the Update Server 136 can move to step 628. In alternate embodiments, step 626 can be optional and/or absent, and the Update Server 136 can move directly to step 628.

At step 628, after authenticating the request for new Identity Data 110 during step 624, the Update Server 136 can verify that during step 620 the Update Server 136 received the encrypted Identity Data 110 from the Key Generation System 128 that is associated with the component identifier 106 included in the authenticated request sent by the device 102 during step 622. If the Update Server 136 has not obtained Identity Data 110 associated with the component identifier 106 in the device's authenticated request, then the request can be rejected at step 626 and no Identity Data 110 is provided to the device 102. If the Update Server 136 has obtained encrypted Identity Data 110 associated with the component identifier 106 in the request then the Update Server 136 can accept the request, locate the encrypted Identity Data 110 corresponding to the component identifier 106 it received from the ID Loader 130 during step 620, and provide the encrypted Identity Data 110 to the device 102 at step 630.

In some embodiments, if the Update Server 136 receives multiple requests for Identity Data 110 from a device 102, such as retried requests in the event of a network outage, accidental reset, or any other reason, the Update Server 136 can determine whether a pre-set or dynamic maximum number of retried requests have been received from that device 102 overall or within a pre-set period of time. If the Update Server 136 determines that the device 102 has exceeded the maximum number of allowable retried requests, the Update Server 136 can reject the request even if it has obtained Identity Data 110 corresponding to the component identifier 106 in the device's request. If the Update Server 136 determines that that the device 102 has not exceeded the maximum number of retried requests, the Update Server 136 can provide the same encrypted Identity Data 110 to the device 102 again. In alternate embodiments, the Update Server 136 does not check for retried requests and/or does not check the number of retried requests against a pre-set or dynamic limit.

At step 632, the device 102 can decrypt the encrypted Identity Data 110 using the OTP Key 108 loaded onto the component 104 during step 604 that has the component identifier 106 associated with the encrypted Identity Data 110. By way of a non-limiting example, the encrypted Identity Data 110 can be associated with the component identifier 106 for the device's SoC, and so the OTP Key 108 loaded on the SoC can be used to decrypt the encrypted Identity Data 110 associated with the SoC's component identifier 106. The decrypted Identity Data 110 can then be validated and installed on the device 102. In some embodiments, the Identity Data 110 is decrypted only within the component 104 associated with the OTP Key 108, such that that particular component 104 can use the Identity Data 110 for authentication or decryption of message or any other purpose, and the decrypted Identity Data 110 is never transmitted outside of that component 104 or accessible by the device vendor 118 or a component provider 116. In alternate embodiments, the decrypted Identity Data 110 can be used or accessible by any or all parts of a device, and/or can be accessible by third parties.

In some embodiments, the Update Server 136 can periodically delete or purge whitelists and/or Identity Data 110 after a pre-set time interval after the time that they are received during steps 618 and/or 620. By way of a non-limiting example, an Update Server 136 can be set to delete whitelists and/or Identity Data 110 after a certain period of time when it is considered less likely that a device will request new Identity Data 110.

Figure 8:
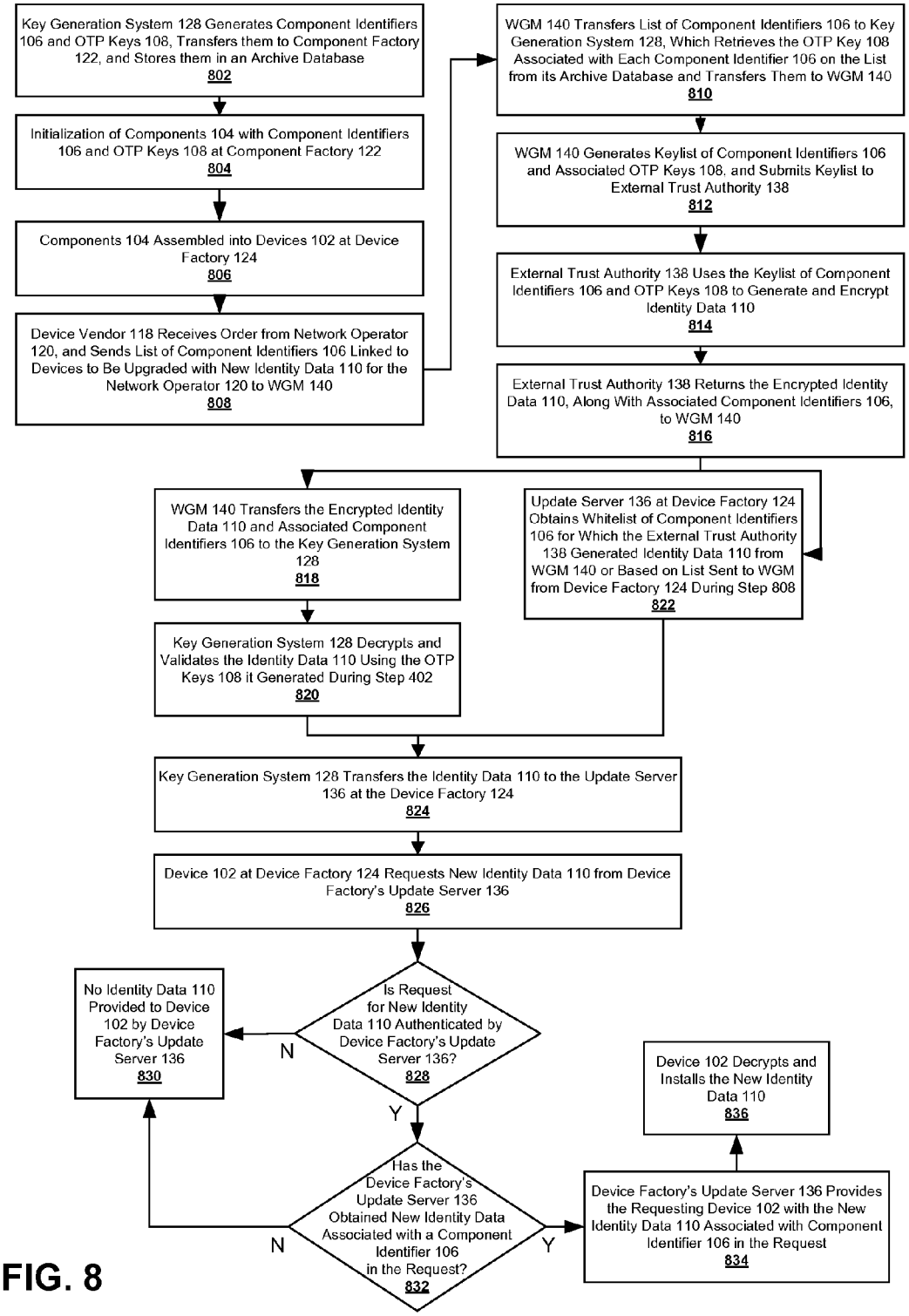
FIG. 8 depicts a flow chart for a third method of obtaining and installing externally-acquired identity data on devices using the operating environment of FIG. 7.
Figure 9:
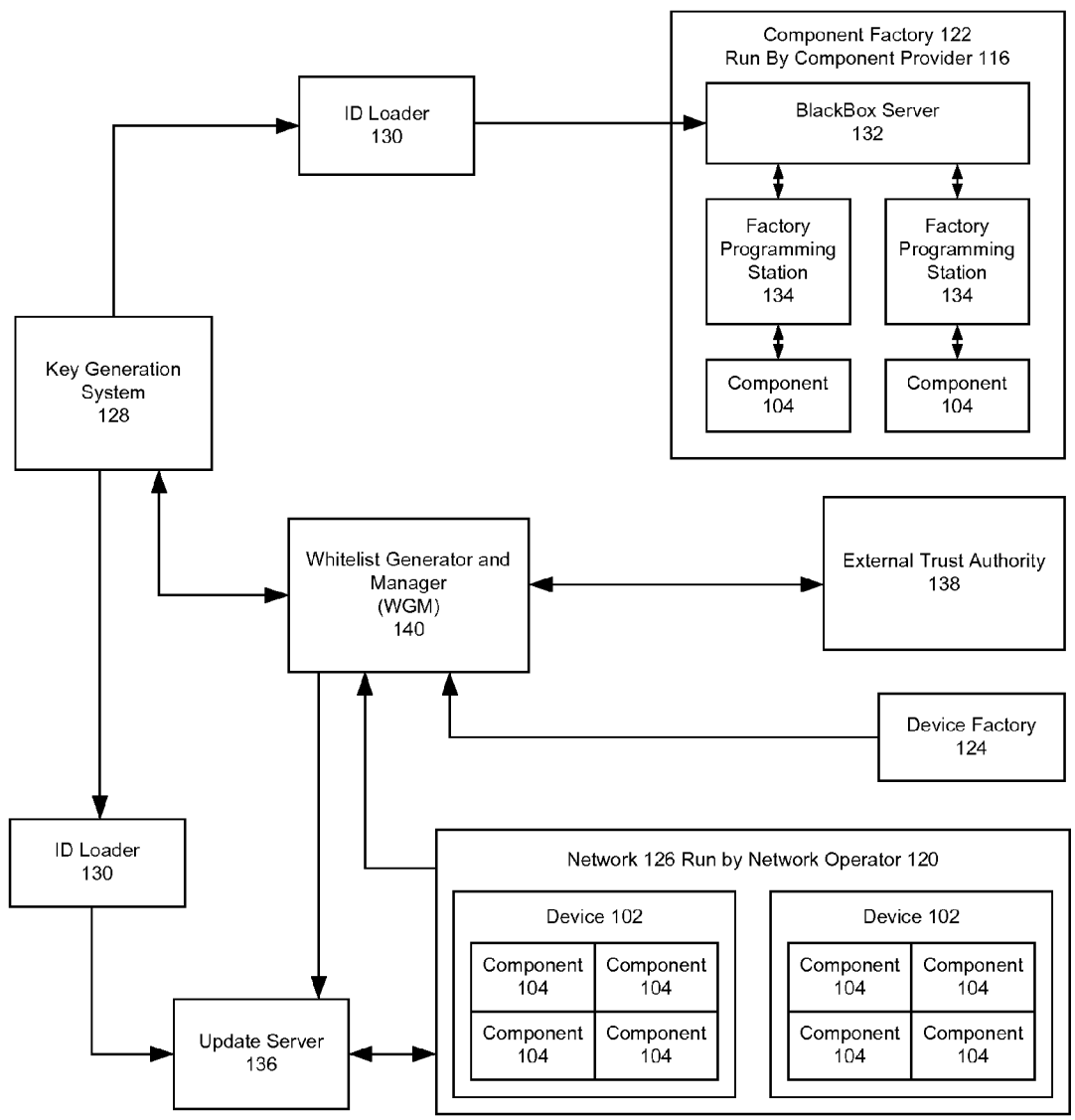
FIG. 9 depicts a fourth embodiment of an operating environment in which processes for provisioning devices with externally-acquired identity data can be implemented.

FIG. 8 depicts a flow chart for a method of obtaining Identity Data 110 from an External Trust Authority 138 and installing that Identity Data 110 on devices 102 before the devices 102 leave a device factory 124. In this method the components 104 can initially be generic or be designated for multiple network operators 120, and so the component identifiers 106 can be extracted from the components 104 at the device factory 124 and their matching OTP Keys 108 can be retrieved from the Key Generation System 128. In some embodiments, the method of FIG. 8 can be used in the operating environment shown in FIG. 7.

At step 802, OTP Keys 108 can be generated at a Key Generation System 128. In some embodiments, the device vendor 118 can own and/or operate the Key Generation System 128. In alternate embodiments, the Key Generation System 128 can be owned and/or operated by an External Trust Authority 138 or any other entity. The OTP Keys 108 generated during this step can be in a generic data type or format compatible with components 104 and devices 102 usable by multiple network operators 120.

In some embodiments, the Key Generation System 128 can randomly generate OTP Keys 108. The Key Generation System 128 can allocate, generate or be pre-loaded with component identifiers 106 that are not yet associated with any particular components 104. Each randomly generated OTP Key 108 can be paired with or associated with a particular component identifier 106 by the Key Generation System 128. In alternate embodiments, the Key Generation System 128 can generate OTP Keys 108 based on particular component identifiers 106 with which they are associated.

The generated OTP Keys 108 and their associated component identifiers 106 can then be securely delivered via an ID Loader 130 to a BlackBox server 132 located at a component factory 122 operated by a component provider 116, such that they can be loaded onto components 104 at the component factory 122. In some embodiments, the device vendor 118 can have provided the component factory 122 with the BlackBox server 132. In other embodiments, the entity that owns the Key Generation System 128 can have provided the BlackBox server 132 to the component factory 122. The Key Generation System 128 can maintain an archive database of the component identifiers 106 and associated OTP Keys 108 it generates.

At step 804, initialization of components 104 the OTP Keys 108 and component identifiers 106 can be performed at the component factory 122 during manufacturing and/or preparation of the components 104. A Factory Programming Station 134 at the component factory 122 can send a Key Data Request to a BlackBox Server 132, requesting an OTP Key 108 and a component identifier 106 for a particular component 104. The BlackBox Server 132 can provide one of the OTP Keys 108 and associated component identifiers 106 received from the ID Loader 130 to the Factory Programming Station 134, which then associates the component 104 with the component identifier 106 and installs the OTP Key 108 on the component 104. By way of a non-limiting example, a Factory Programming Station 134 can obtain a component identifier 106 and OTP Key 108 for a newly-manufactured SoC from a BlackBox Server 132 at the component factory 122, and then associate the SoC with the component identifier 106 and install the OTP Key 108 on the SoC. Each component 104 can be transferred to a device factory 124 for assembly into a device 102 at step 806.

At step 808, a device vendor 118 can receive an order from a network operator 120 for devices 102 being assembled or prepared at a device factory 124. The network operator 120 can request that the devices 102 be provisioned with new Identity Data 110 before the devices 102 are shipped from the device factory 124. The devices 102 and their components 104 can have been manufactured generically for any of a plurality of network operators 120, but when a particular network operator 120 orders devices 102, it can request that the devices 102 be provisioned with Identity Data 110 specific to that particular network operator 120 prior to leaving the device factory 124. The device vendor 118 can prepare a list of component identifiers 106, and can upload the list to the WGM 140 from the device factory 124. The list can contain the component identifier 106 for a component 104 within each device 102 that will be transferred to the network operator 120 to fulfill the network operator's order. The list of component identifiers 106 can be used to obtain new Identity Data 110 for the designated devices 102, which can be installed on the devices 102 before they are shipped from the device factory 124 to the network operator 120.

At step 810, the WGM 140 can receive the list of component identifiers 106 from the device factory 124, and can transfer the list to the Key Generation System 128. In some embodiments in which the Key Generation System 128 is offline, files can be transferred between the Key Generation System 128 and WGM 140 by loading them onto removable media such as a flash drive, CD-ROM, or other media which can be physically transported to and accessed by the other module. In alternate embodiments, the Key Generation System 128 can be online and be in data communication with the WGM 140 directly. The Key Generation System 128 can review the list of component identifiers 106, and retrieve the OTP Key 108 associated with each component identifier 106 from its archive database. The Key Generation System 128 can transfer the retrieved OTP Keys 108 associated with the listed component identifiers 106 to the WGM 140.

At step 812, the WGM 140 can generate and maintain a keylist of the component identifiers 106 and their associated OTP Keys 108 obtained from the Key Generation System 128 in step 810. The WGM 140 can submit the keylist to an External Trust Authority 138 to request new Identity Data 110 for the devices 102 that incorporate components 104 designated by the component identifiers 106 on the keylist.

At step 814, the External Trust Authority 138 can use the keylist, including the component identifiers 106 and their associated OTP Keys 108, it received from the WGM 140 during step 812 to generate and encrypt new Identity Data 110 for devices 102. In some embodiments, the External Trust Authority 138 can pre-generate one or more new pieces of Identity Data 110, and then link each newly generated piece of Identity Data 110 to one of the component identifiers 106 on the keylist received from the WGM 140 during step 812. In other embodiments, the External Trust Authority 138 can use the component identifiers 106 on the keylist received from the WGM 140 during step 812 to generate new Identity Data 110 associated with those component identifiers 106. By way of a non-limiting example, in some embodiments the Identity Data 110 can comprise a digital certificate, and the External Trust Authority 138 can incorporate a component identifier 106 into one of the fields within the digital certificate. After the External Trust Authority 138 generates each piece of Identity Data 110 and links it to a component identifier 106, the External Trust Authority 138 can encrypt the Identity Data 110 with the OTP Key 108 associated with component identifier 106 linked to the Identity Data 110.

At step 816, the External Trust Authority 138 can provide the generated Identity Data 110, along with a list of the component identifiers 106 associated with each piece of Identity Data 110, to the WGM 140.

At step 818, the WGM 140 can send the Identity Data 110 and their associated component identifiers 106 received from the External Trust Authority 138 to the Key Generation System 128. As mentioned above, in some embodiments data transfer between the WGM 140 and Key Generation System 128 can occur through offline methods such as transferring files via a removable flash drive or other physical media, while in alternate embodiments there can be a direct data connection between the WGM 140 and Key Generation System 128.

At step 820, the Key Generation System 128 can validate the Identity Data 110 generated by the External Trust Authority 138 for each component identifier 106 by decrypting the Identity Data 110 using the OTP Key 108 for the component identifier 106 and checking the integrity and cryptographic properties of the decrypted Identity Data 110. By way of non-limiting examples, the Key Generation System 128 can confirm that the Identity Data 110 is not corrupted, that key pairs are valid, and/or perform any other cryptographic operation. The Key Generation System 128 can use the component identifiers 106 and OTP Keys 108 in its archive database to decrypt the Identity Data 110 received from the External Trust Authority 138 through the WGM 140. In some embodiments and/or situations, the Key Generation System 128 can repackage Identity Data 110 into a data format used by a particular type of device 102, while in other embodiments or situations the Key Generation System 128 does not repackage the Identity Data 110.

At step 822, in some embodiments the Update Server 136 located at the device factory 124 from which the list of component identifiers 106 was obtained during step 808 can obtain a whitelist of component identifiers 106 associated with Identity Data 110 generated by the External Trust Authority 138 during step 814. In some embodiments, the whitelist can be obtained from the WGM 140 after step 816. The WGM 140 can know which component identifiers 106 were associated with new Identity Data 110 after receiving the Identity Data 110 from the External Trust Authority 138 in step 814, and can send those component identifiers 106 to the Update Server 136 as a whitelist. In other embodiments, the whitelist obtained by the Update Server 136 can be a copy of the list sent from the device factory 124 during step 808 that contained component identifiers 106 associated with devices 102 to be upgraded with new Identity Data 110. In alternate embodiments, step 822 can be optional and/or absent.

At step 824, the Key Generation System 128 can transfer the encrypted Identity Data 110 received from the WGM 140 during step 818 to an Update Server 136 located at the device factory 124 from which the list of component identifiers 106 was obtained during step 808. The Key Generation System 128 can forward the Identity Data 110 to the Update Server 136 via an ID Loader 130.

In some embodiments, during step 824 the Update Server 136 can additionally verify that it has received newly generated Identity Data 110 from the Key Generation System 128 that is associated with each component identifier 106 on the whitelist of component identifiers 106 obtained during step 822. The whitelist obtained during step 822 can indicate the component identifiers 106 for which the External Trust Authority did or was expected to generate new Identity Data 110 during step 814, and so the whitelist can be used to confirm that the Update Server 136 has received all expected pieces of newly generated Identity Data 110. However, in alternate embodiments step 822 can be optional or absent such that the Update Server 136 does not receive a whitelist of component identifiers 106 during step 822, and this extra check against the whitelist is not performed.

At step 826, a device 102 at the device factory 124 that is planned to be transferred to the network operator to fulfill the network operator's order can request Identity Data 110 from the Update Server 136 at the device factory 124. The device 102 can comprise a component 104 previously loaded with a component identifier 106 and OTP Key 108 at a component factory 122 during step 804. The request for Identity Data 110 can contain a component identifier 106 that is linked to one of the generated pieces of Identity Data 110. By way of a non-limiting example, in some embodiments the Identity Data 110 can be linked to the component identifier 106 for the device's SoC, and so the device 102 can include the SoC's component identifier 106 in its request for Identity Data 110.

At step 828, in some embodiments the Update Server 136 can use data in the device's request for new Identity Data 110 regarding previously installed Identity Data 110 to authenticate the request for new Identity Data 110. By way of a non-limiting example, the request for new Identity Data 110 can also include a digital certificate 114 previously installed on the device 102 and a digital signature, which can be used by the Update Server 136 to confirm that the request for new Identity Data 110 came from a device with a valid model number or Stock Keeping Unit (SKU) that is allowed to request Identity Data 110. The Update Server 136 can verify the signature on the digital certificate 114 based on a public key from a trusted Certificate Authority. The public key from the digital certificate 114 can then be used to validate the signature included in the request for new Identity Data 110. If the request for new Identity Data 110 is not authenticated, the request can be rejected at step 830 and no Identity Data 110 is provided to the device 102. If the request for new Identity Data 110 is authenticated, the Update Server 136 can move to step 832. In alternate embodiments, step 828 can be optional and/or absent, and the Update Server 136 can move directly to step 832.

At step 832, the Update Server 136 can receive the device's request for new Identity Data 110 and verify that during step 824 the Update Server 136 received the encrypted Identity Data 110 from the Key Generation System 128 that is associated with the component identifier 106 included in the request sent by the device 102 during step 826. If the Update Server 136 has not obtained Identity Data 110 associated with the component identifier 106 in the device's request, then the request can be rejected at step 830 and no Identity Data 110 is provided to the device 102. If the Update Server 136 has obtained encrypted Identity Data 110 associated with the component identifier 106 in the request, then the Update Server 136 can accept the request, locate the encrypted Identity Data 110 corresponding to the validated component identifier 106 it received from the ID Loader 130 during step 824, and provide the encrypted Identity Data 110 to the device 102 at step 834.

In some embodiments, if the Update Server 136 receives multiple requests for Identity Data 110 from a device 102, such as retried requests in the event of a network outage, accidental reset, or any other reason, the Update Server 136 can determine whether a pre-set or dynamic maximum number of retried requests have been received from that device 102 overall or within a pre-set period of time. If the Update Server 136 determines that the device 102 has exceeded the maximum number of allowable retried requests, the Update Server 136 can reject the request even if it has obtained Identity Data 110 corresponding to the component identifier 106 in the device's request. If the Update Server 136 determines that that the device 102 has not exceeded the maximum number of retried requests, the Update Server 136 can provide the same encrypted Identity Data 110 to the device 102 again. In alternate embodiments, the Update Server 136 does not check for retried requests and/or does not check the number of retried requests against a pre-set or dynamic limit.

At step 836, the device 102 can decrypt the encrypted Identity Data 110 using the OTP Key 108 loaded onto the component 104 during step 804 that has the component identifier 106 associated with the encrypted Identity Data 110. By way of a non-limiting example, the encrypted Identity Data 110 can be associated with the component identifier 106 for the device's SoC, and so the OTP Key 108 loaded on the SoC can be used to decrypt the encrypted Identity Data 110 associated with the SoC's component identifier 106. The decrypted Identity Data 110 can then be validated and installed on the device 102. In some embodiments, the Identity Data 110 is decrypted only within the component 104 associated with the OTP Key 108, such that that particular component 104 can use the Identity Data 110 for authentication or decryption of message or any other purpose, and the decrypted Identity Data 110 is never transmitted outside of that component 104 or accessible by the device vendor 118 or a component provider 116. In alternate embodiments, the decrypted Identity Data 110 can be used or accessible by any or all parts of a device, and/or can be accessible by third parties.

In some embodiments, the Update Server 136 can periodically delete or purge whitelists and/or Identity Data 110 after a pre-set time interval after the time that they are received during steps 822 and/or 824. By way of a non-limiting example, an Update Server 136 can be set to delete whitelists and/or Identity Data 110 after a certain period of time when it is considered less likely that a device will request new Identity Data 110.

Figure 10:
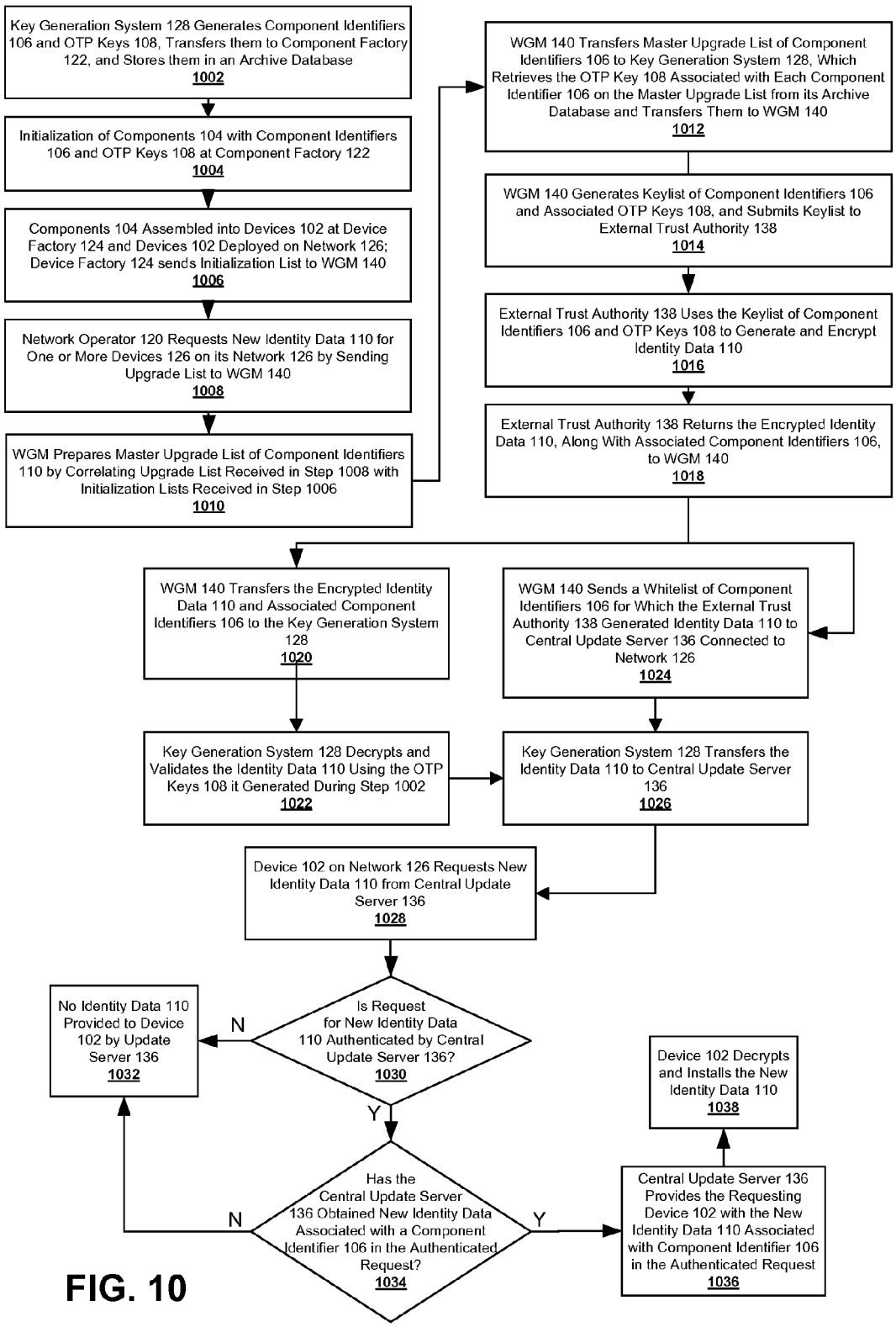
FIG. 10 depicts a flow chart for a fourth method of obtaining and installing externally-acquired identity data on devices using the operating environment of FIG. 9.

FIG. 10 depicts a flow chart for a method of obtaining Identity Data 110 from an External Trust Authority 138 and installing that Identity Data 110 on devices 102 after the devices 102 have been deployed on a network 126 of a particular network operator 120. In this method the components 104 can initially be generic or be designated for multiple network operators 120, and so the component identifiers 106 can be extracted from the components 104 before leaving the device factory 124 and being deployed on a network 126. In some embodiments, the method of FIG. 10 can be used in the operating environment shown in FIG. 9.

At step 1002, OTP Keys 108 can be generated at a Key Generation System 128. In some embodiments, the device vendor 118 can own and/or operate the Key Generation System 128. In alternate embodiments, the Key Generation System 128 can be owned and/or operated by an External Trust Authority 138 or any other entity. The OTP Keys 108 generated during this step can be in a generic data type or format compatible with components 104 and devices 102 usable by multiple network operators 120.

In some embodiments, the Key Generation System 128 can randomly generate OTP Keys 108. The Key Generation System 128 can allocate, generate or be pre-loaded with component identifiers 106 that are not yet associated with any particular components 104. Each randomly generated OTP Key 108 can be paired with or associated with a particular component identifier 106 by the Key Generation System 128. In alternate embodiments, the Key Generation System 128 can generate OTP Keys 108 based on particular component identifiers 106 with which they are associated.

The generated OTP Keys 108 and their associated component identifiers 106 can then be securely delivered via an ID Loader 130 to a BlackBox server 132 located at a component factory 122 operated by a component provider 116, such that they can be loaded onto components 104 at the component factory 122. In some embodiments, the device vendor 118 can have provided the component factory 122 with the BlackBox server 132. In other embodiments, the entity that owns the Key Generation System 128 can have provided the BlackBox server 132 to the component factory 122. The Key Generation System 128 can maintain an archive database of the component identifiers 106 and associated OTP Keys 108 it generates.

At step 1004, initialization of components 104 the OTP Keys 108 and component identifiers 106 can be performed at the component factory 122 during manufacturing and/or preparation of the components 104. A Factory Programming Station 134 at the component factory 122 can send a Key Data Request to a BlackBox Server 132, requesting an OTP Key 108 and a component identifier 106 for a particular component 104. The BlackBox Server 132 can provide one of the OTP Keys 108 and associated component identifiers 106 received from the ID Loader 130 to the Factory Programming Station 134, which then associates the component 104 with the component identifier 106 and installs the OTP Key 108 on the component 104. By way of a non-limiting example, a Factory Programming Station 134 can obtain a component identifier 106 and OTP Key 108 for a newly-manufactured SoC from a BlackBox Server 132 at the component factory 122, and then associate the SoC with the component identifier 106 and install the OTP Key 108 on the SoC.

At step 1006, each component 104 can be transferred to a device factory 124 for assembly into a device 102. The devices 102 and their components 104 can have been initially manufactured generically for any of a plurality of network operators 120, but can be authorized to access a network 126 of a particular network operator 120 prior to leaving the device factory 124. At the device factory 124, each device 102 can be associated with an account using an account identifier or physical device identifier to authorize the device to access a particular network 126. In some embodiments, a device 102 can be authorized to access the network 126 at the device factory 124 by associating the device 102 with an account using an account identifier, such as an account number, retrieved from an account or identity management system operated by the network operator 120. In other embodiments, the device 102 can be authorized to access the network 126 at the device factory 124 by associating the device 102 with an account using a physical device identifier assigned to the device 102 at the device factory 124. The physical device identifier can be a unique identifier for the device 102 as a whole, such as a serial number, Wide Area Network Media Access Control (WAN MAC) Address, or any other identifier.

Each device factory 124 can forward an initialization list to a WGM 140 that includes data regarding each device it manufactures and/or initializes for a particular network operator 120. The initialization list can include the account identifiers, and/or physical device identifiers associated with each device 102 during step 1006, as well as the component identifiers 106 associated with individual components 104 of each device 102.

At step 1008, the network operator 120 can request that one or more devices 102 already deployed on its network 126 that are no longer located at the device factory 124 obtain new Identity Data 110 from a central Update Server 136 that is connected to the network 126. The network operator 120 can authorize each device 102 access the network 126 to request new Identity Data 110 from the Update Server 136. In some embodiments, new Identity Data 110 can be requested to replace Identity Data 110 already installed on a device 102, such as Identity Data 110 previously installed at a device factory 124 prior to the device's deployment on the network 126 through a process such as those shown in FIG. 4 or 8.

The network operator 120 can send an upgrade list to the WGM 140. In some embodiments, the upgrade list can be sent to the WGM 140 from a Network Access Authorization Server on its network 126. The upgrade list can indicate the identities of each device 102 that the network operator 120 desires to upgrade with new Identity Data 110. The upgrade list can contain the account identifiers and/or physical device identifiers associated with devices 102 during step 1006 for each device 102 that the network operator 120 desires to upgrade. In some embodiments, the upgrade list can additionally indicate the component identifiers 106 associated with components 104 within the devices 102 to be upgraded.

At step 1010, the WGM 140 can receive the upgrade list from the network operator 120. In some embodiments, the WGM 140 can generate a master upgrade list by correlating the account identifiers and/or physical device identifiers of each device 102 on the network operator's upgrade list with the component identifiers 106 associated with those account identifiers and/or physical device identifiers on one or more initialization lists received from one or more device factories 124 during step 1006. By way of a non-limiting example, in some situations and/or embodiments, the network operator 120 does not necessarily know the component identifiers 106 associated with the components 104 within each device 102 it wishes to upgrade, but does know the account identifier or physical device identifier linked to each device's account. The network operator 120 can include the account identifiers or physical device identifiers of the devices it wants to upgrade on its upgrade list, and the WGM 140 can determine the component identifier 106 linked with each account identifier or physical device identifier on the upgrade list from the initialization lists it received from one or more device factories 124 during step 1006.

At step 1012, the WGM 140 can send the master upgrade list it generated during step 1010 to the Key Generation System 128. As mentioned above, in some embodiments data transfer between the WGM 140 and Key Generation System 128 can occur through offline methods such as transferring files via a removable flash drive or other physical media, while in alternate embodiments there can be a direct data connection between the WGM 140 and Key Generation System 128. The master upgrade list can contain the component identifiers 106 of components 104 within particular devices 102 that are to be upgraded with new Identity Data 110. The Key Generation System 128 can review the master upgrade list of component identifiers 106, and retrieve the OTP Key 108 associated with each component identifier 106 from its archive database. The Key Generation System 128 can transfer the retrieved OTP Keys 108 associated with the listed component identifiers 106 to the WGM 140.

At step 1014, the WGM 140 can generate and maintain a keylist of the component identifiers 106 and their associated OTP Keys 108 obtained from the Key Generation System 128 in step 1012. The WGM 140 can submit the keylist to an External Trust Authority 138 to request new Identity Data 110 for the devices 102 that incorporate components 104 designated by the component identifiers 106 on the keylist.

At step 1016, the External Trust Authority 138 can use the keylist, including the component identifiers 106 and their associated OTP Keys 108, it received from the WGM 140 during step 1014 to generate and encrypt new Identity Data 110 for devices 102. In some embodiments, the External Trust Authority 138 can pre-generate one or more new pieces of Identity Data 110, and then link each newly generated piece of Identity Data 110 to one of the component identifiers 106 on the keylist received from the WGM during step 1014. In other embodiments, the External Trust Authority 138 can use the component identifiers 106 on the keylist received from the WGM 140 during step 1014 to generate new Identity Data 110 associated with those component identifiers 106. By way of a non-limiting example, in some embodiments the Identity Data 110 can comprise a digital certificate, and the External Trust Authority 138 can incorporate a component identifier 106 into one of the fields within the digital certificate. After the External Trust Authority 138 generates each piece of Identity Data 110 and links it to a component identifier 106, the External Trust Authority 138 can encrypt the Identity Data 110 with the OTP Key 108 associated with component identifier 106 linked to the Identity Data 110

At step 1018, the External Trust Authority 138 can provide the generated Identity Data 110, along with a list of the component identifiers 106 associated with each generated piece of Identity Data 110, to the WGM 140. The WGM 140 can follow steps 1020 and/or 1024 described below.

At step 1020, the WGM 140 can send the Identity Data 110 and their associated component identifiers 106 received from the External Trust Authority 138 to the Key Generation System 128. As mentioned above, in some embodiments data transfer between the WGM 140 and Key Generation System 128 can occur through offline methods such as transferring files via a removable flash drive or other physical media, while in alternate embodiments there can be a direct data connection between the WGM 140 and Key Generation System 128.

At step 1022, the Key Generation System 128 can validate the Identity Data 110 generated by the External Trust Authority 138 for each component identifier 106 by decrypting the Identity Data 110 using the OTP Key 108 for the component identifier 106 and checking the integrity and cryptographic properties of the decrypted Identity Data 110. By way of non-limiting examples, the Key Generation System 128 can confirm that the Identity Data 110 is not corrupted, that key pairs are valid, and/or perform any other cryptographic operation. The Key Generation System 128 can use the component identifiers 106 and OTP Keys 108 in its archive database to decrypt the Identity Data 110 received from the External Trust Authority 138 through the WGM 140. In some embodiments and/or situations, the Key Generation System 128 can repackage Identity Data 110 into a data format used by a particular type of device 102, while in other embodiments or situations the Key Generation System 128 does not repackage the Identity Data 110.

At step 1024, the WGM 140 can forward a whitelist to the Update Server 136 that is in communication with the network 126. The whitelist can contain the component identifiers 106 associated with Identity Data 110 generated by the External Trust Authority 138 during step 1016. In alternate embodiments, step 618 can be optional and/or absent.

At step 1026, the Key Generation System 128 can transfer, via an ID Loader 130, the encrypted Identity Data 110 received from the WGM 140 during step 1018 and validated during step 1022, along with their associated component identifiers 106, to an Update Server 136 in communication with a network 126 upon which the devices 102 on the network operator's upgrade list are deployed. In this embodiment, the Update Server 136 can be centralized and loaded with all the newly generated Identity Data 110 and associated component identifiers 106, such that any device 102 on the network 126 can contact the Update Server 136 to request new Identity Data 110.

In some embodiments, during step 1026 the Update Server 136 can additionally verify that it has received newly generated Identity Data 110 from the Key Generation System 128 that is associated with each component identifier 106 on the whitelist of component identifiers 106 received from the WGM 140 during step 1024. The whitelist sent to the Update Server 136 from the WGM 140 can indicate the component identifiers 106 for which the External Trust Authority generated new Identity Data 110 during step 1016, and so the whitelist can be used to confirm that the Update Server 136 has received all expected pieces of newly generated Identity Data 110. However, in alternate embodiments step 1024 can be optional or absent such that the Update Server 136 does not receive the whitelist of component identifiers 106 from the WGM 140, and this extra check against the whitelist is not performed.

At step 1028, a device 102 on the network 126 can request new Identity Data 110 from the central Update Server 136 that is connected to the network 126. The device 102 can be one for which the network operator 120 requested new Identity Data 110 during step 1008. The device 102 can comprise a component 104 previously loaded with a component identifier 106 and OTP Key 108 at a component factory 122 during step 1004. The request for Identity Data 110 can contain a component identifier 106 that is linked to one of the pieces of Identity Data 110. By way of a non-limiting example, in some embodiments the Identity Data 110 can be linked to the component identifier 106 for the device's SoC, and so the device 102 can include the SoC's component identifier 106 in its request for Identity Data 110. In this embodiment, in addition to including the component identifier 106, the request for Identity Data 110 can also contain data from Identity Data 110 previously installed on the device 102, such as digital keys 112 and/or digital certificates 114. By way of a non-limiting example, a request for Identity Data 110 can include a digital certificate 114 previously installed on the device 102 and a digital signature, in addition to a component identifier 106. In some embodiments, the request for Identity Data can further comprise an account identifier or physical device identifier.

At step 1030, in some embodiments the Update Server 136 can use the data in the device's request for new Identity Data 110 regarding the previously installed Identity Data 110 to authenticate the request for new Identity Data 110. By way of a non-limiting example, the request for new Identity Data 110 can also include a digital certificate 114 previously installed on the device 102 and a digital signature, which can be used by the Update Server 136 to confirm that the request for new Identity Data 110 came from a device with a valid model number or Stock Keeping Unit (SKU) that is allowed to request Identity Data 110. The Update Server 136 can verify the signature on the digital certificate 114 based on a public key from a trusted Certificate Authority. The public key from the digital certificate 114 can then be used to validate the signature included in the request for new Identity Data 110. If the request for new Identity Data 110 is not authenticated, the request can be rejected at step 1032 and no Identity Data 110 is provided to the device 102. If the request for new Identity Data 110 is authenticated, the Update Server 136 can move to step 1034. In alternate embodiments, step 1030 can be optional and/or absent, and the Update Server 136 can move directly to step 1034.

At step 1034, after authenticating the request for new Identity Data 110 during step 1030, the Update Server 136 can verify that during step 1026 the Update Server 136 received the encrypted Identity Data 110 from the Key Generation System 128 that is associated with the component identifier 106 included in the authenticated request sent by the device 102 during step 1028. If the Update Server 136 has not obtained Identity Data 110 associated with the component identifier 106 in the device's authenticated request, then the request can be rejected at step 1032 and no Identity Data 110 is provided to the device 102. If the Update Server 136 has obtained encrypted Identity Data 110 associated with the component identifier 106 in the request, then the Update Server 136 can accept the request, locate the encrypted Identity Data 110 corresponding to the component identifier 106 it received from the ID Loader 130 during step 1026, and provide the encrypted Identity Data 110 to the device 102 at step 1036. In alternate embodiments, the Update Server 136 can additionally verify or deny a device's request by determining whether the component identifier 106 in the request contains a component identifier on the whitelist received from the WGM during step 1024.

In some embodiments, if the Update Server 136 receives multiple requests for an Identity Data 110 from a device 102, such as retried requests in the event of a network outage, accidental reset, or any other reason, the Update Server 136 can determine whether a pre-set or dynamic maximum number of retried requests have been received from that device 102 overall or within a pre-set period of time. If the Update Server 136 determines that the device 102 has exceeded the maximum number of allowable retried requests, the Update Server 136 can reject the request even if it has obtained Identity Data 110 corresponding to the component identifier 106 in the device's request. If the Update Server 136 determines that that the device 102 has not exceeded the maximum number of retried requests, the Update Server 136 can provide the same encrypted Identity Data 110 to the device 102 again as long as the component identifier 106 in the request appears on the whitelist received during step 1026 and/or as long as the request includes exactly the same account identifier and/or physical device identifier which were present in the previous requests from the same device 102. In alternate embodiments, the Update Server 136 does not check for retried requests and/or does not check the number of retried requests against a pre-set or dynamic limit.

At step 1038, the device 102 can decrypt the encrypted Identity Data 110 using the OTP Key 108 loaded onto the component 104 during step 1004 that has the component identifier 106 associated with the encrypted Identity Data 110. By way of a non-limiting example, the encrypted Identity Data 110 can be associated with the component identifier 106 for the device's SoC, and so the OTP Key 108 loaded on the SoC can be used to decrypt the encrypted Identity Data 110 associated with the SoC's component identifier 106. The decrypted Identity Data 110 can then be validated and installed on the device 102. In some embodiments, the Identity Data 110 is decrypted only within the component 104 associated with the OTP Key 108, such that that particular component 104 can use the Identity Data 110 for authentication or decryption of message or any other purpose, and the decrypted Identity Data 110 is never transmitted outside of that component 104 or accessible by the device vendor 118 or a component provider 116. In alternate embodiments, the decrypted Identity Data 110 can be used or accessible by any or all parts of a device, and/or can be accessible by third parties.

In some embodiments, the Update Server 136 can periodically delete or purge whitelists and/or Identity Data 110 after a pre-set time interval after the time that they are received during steps 1024 and/or 1026. By way of a non-limiting example, an Update Server 136 can be set to delete whitelists and/or Identity Data 110 after a certain period of time when it is considered less likely that a device will request a new Identity Data 110.

Figure 11:
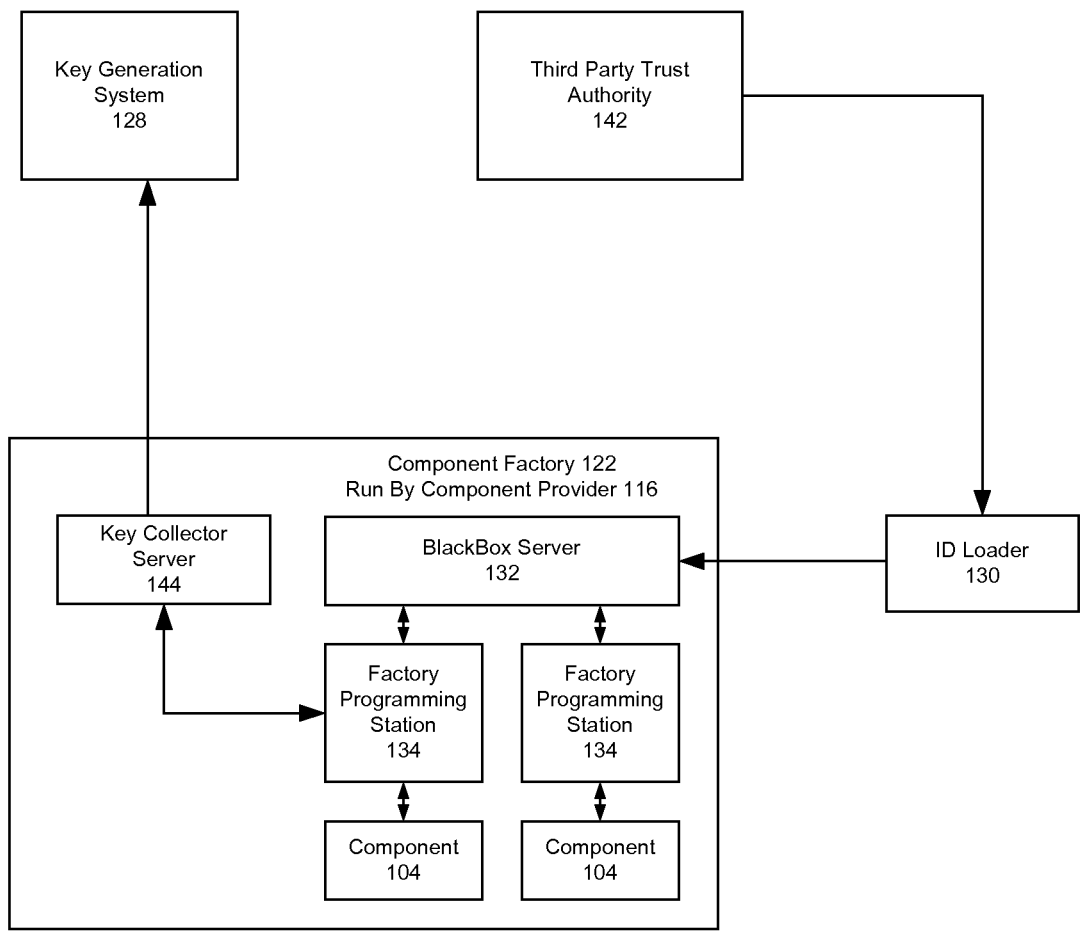
FIG. 11 depicts a embodiment of an operating environment in which processes for the initial generating of component identifiers and/or OTP Keys can be implemented.

FIG. 11 depicts an alternate embodiment of an operating environment that can be used in place of or in addition to the operating environments shown in FIG. 3, 5, 7, or 9 for the initial steps of generating and loading component identifiers 106 and/or OTP Keys onto components 104. In some alternate embodiments, the initial steps of generating component identifiers 106 and/or OTP Keys 108 at a device vendor's offline Key Generation System 128 (such as steps 402, 602, 802, and 1002) can alternately be performed by a Third Party Trust Authority 142 separate from the device vendor 118. In some embodiments, the Third Party Trust Authority 142 can be the device vendor 118, External Trust Authority 138, or any other trust authority or entity.

Figure 12:
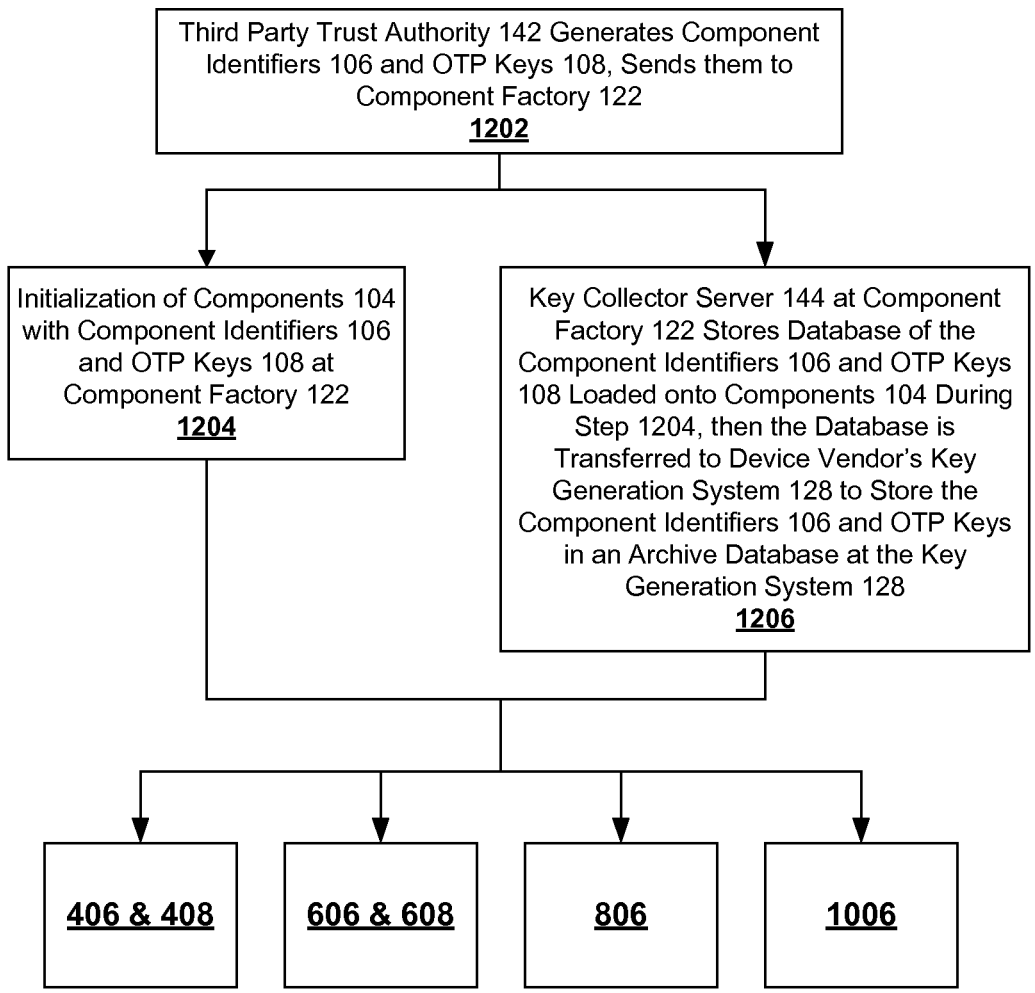
FIG. 12 depicts a flow chart for an alternate method of initially generating and installing component identifiers and/or OTP Keys on components using the operating environment of FIG. 11.

FIG. 12 depicts a flow chart for a method for the Key Generation System 128 in any of the use cases described above to obtain component identifiers 106 and/or OTP Keys 108 from the Third Party Trust Authority 142 via a component provider 116. For example, in some embodiments and/or situations, the steps of FIG. 12 can alternately be used in place of steps 402-404, 602-604, 802-804, or 1002-1004 of FIG. 4, 6, 8, or 10.

At step 1202, a Blackbox Server 132 at a component factory 122 can obtain or generate component identifiers 106 and/or OTP Keys. In some embodiments, the Blackbox Server can obtain component identifiers 106 and/or OTP Keys 108 from a Third Party Trust Authority 142 that generated or stored the component identifiers 106 and/or OTP Keys 108. In some of these embodiments, the Third Party Trust Authority 142 can load the component identifiers 106 and/or OTP Keys 108 to the BlackBox Server 132 using an ID Loader 130, offline or manual methods, or directly. In some embodiments, the BlackBox server 132 can have been provided to the component factory 122 by the Third Party Trust Authority 142 instead of the device vendor 118. In alternate embodiments, the BlackBox Server 132 can itself generate component identifiers 106 and/or OTP Keys, or obtain them from any other entity.

At step 1204, initialization of components 104 with OTP Keys 108 and component identifiers 106 can be performed at the component factory 122 during manufacturing and/or preparation of the components 104. A Factory Programming Station 134 at the component factory 122 can send a Key Data Request to the BlackBox Server 132, requesting an OTP Key 108 and a component identifier 106 for a particular component 104. The BlackBox Server 132 can provide one of the OTP Keys 108 and associated component identifiers 106 it obtained or generated during step 1202 to the Factory Programming Station 134, which then associates the component 104 with the component identifier 106 and installs the OTP Key 108 on the component 104. By way of a non-limiting example, a Factory Programming Station 134 can obtain a component identifier 106 and OTP Key 108 for a newly-manufactured SoC from a BlackBox Server 132 at the component factory 122, and then associate the SoC with the component identifier 106 and install the OTP Key 108 on the SoC. Each component 104 can later be transferred to a device factory 124 for assembly into a device 102.

At step 1206, a Key Collector Server 144 located at the component factory 122 can collect copies of component identifiers 106 and OTP Keys 108 when a Factory Programming Station 134 loads them onto each component 104. In some embodiments, the Key Collector Server 144 can transfer the component identifiers 106 and OTP Keys 108 in its database to the Key Generation System 128. In some embodiments, the transfer of information between the Key Collector Server 144 and Key Generation System can occur by manually transferring data via removable media. By way of a non-limiting example, the Key Generation System 128 can be air-gapped such that it is off-line for security reasons, and the component identifiers 106 and OTP Keys 108 can be transferred manually from the Key Collector Server 144 to the Key Generation System 128 with a removable USB flash drive. As discussed above, in some embodiments the Key Generation System 128 can be owned and/or operated by a device vendor 118. In other embodiments, the Key Generation System 128 can be owned and/or operated by the External Trust Authority 138 and/or any other entity.

After the Key Generation System 128 receives the component identifiers 106 and OTP Keys from the Key Collector Server 144, the Key Generation System 128 can store the component identifiers 106 and OTP Keys in an archive database for later use. After step 1206, once the component identifiers 106 and OTP Keys 108 have been loaded onto components, the process can move to any of: steps 406 and 408 of FIG. 4; steps 606 and 608 of FIG. 6; step 806 of FIG. 8; and step 1006 of FIG. 10.

In some embodiments, the device vendor 118 can itself act as the External Trust Authority 138 in the methods and operating environments shown in FIGS. 4-10. By way of a non-limiting example, the device vendor 118 itself can generate new Identity Data 110 and/or encrypt the new Identity Data 110 using OTP Keys 108. In other embodiments, the new Identity Data 110 can be generated by an External Trust Authority 138 separate from the device vendor 118, and the External Trust Authority 138 can also be a separate entity distinct from the Third Party Trust Authority 142.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method for updating identity data on a device, comprising:
    acQiuring a device comprising a component, said component being associated with a component identifier and having a One Time Programmable Key installed on said component;
    submitting said component identifier an said One Time Programmable Key to an External Trust Authority;
    receiving new identity data tied to said component identifier from said External Trust Authority, said new identity data being encrypted by said External Trust Authority with said One Time Programmable Key;
    loading said new identify data onto an Update Server;
    receiving a request at said Update Server from said device, said request requesting said new identity data; and
    providing said new identity data to said device upon receipt of said request, upon which said device decrypts and installs said identity data using said One Time Programmable Key installed on said component with said device.

2. The method of claim 1, wherein said Update Server is located at a device factory, such that said new identity data is provided to said device while the device is at said device factory.

3. The method of claim 1, wherein said Update Server is connected to a network upon which said device has been deployed, such that said new identity data is provided to said device over said network.

4. The method of claim 1, further comprising:
    generating said One Time Programmable Key at a Key Generation System;
    transferring said One Time Programmable Key to a blackbox server at a component factory for loading onto said component;
    receiving said component from said component factory; and
    incorporating said component into said device during manufacture.

5. The method of claim 4, wherein said Key Generation System is offline, and said One Time Programmable Key is transferred to said blackbox server through an ID Loader.

6. The method of claim 4, further comprising:
    transferring said new identity data received from said External Trust Authority to said Key Generation System;
    decrypting and validating said new identity data at said Key Generation System, using a copy of said One Time Programmable Key stored at an archive database at said Key Generation System; and
    loading said new identity data onto said Update Server from said Key Generation System.

7. The method of claim 4, further comprising:
    receiving identifying information at a Whitelist Generator and Manager from a network operator that describes a particular device that said network operator desires to upgrade with new identity data, wherein said particular device is already deployed on a network;
    receiving said component identifier and said One Time Programmable Key tied to said component of said particular device at said Whitelist Generator and Manager from said Key Generation System;
    generating a keylist at said Whitelist Generator and Manager by matching said identifying information received from said network operator with said component identifier and said One Time Programmable Key received from said Key Generation System; and providing said keylist to said External Trust Authority to generate said new identity data based on the One Time Programmable Key in the keylist.

8. The method of claim 7, wherein said identifying information is an account identifier.

9. The method of claim 7, wherein said identifying information is a physical device identifier.

10. The method of claim 1, further comprising:
obtaining said component identifier and said One Time Programmable Key from a Key Collector Server at a component factory.

11. The method of claim 1, wherein said One Time Programmable Key is in a format specific to a particular network operator.

12. The method of claim 1, wherein said One Time Programmable Key is in a generic format not listed to a particular network operator.

13. The method of claim 1, wherein submitting said component identifier and said One Time Programmable Key tied to a particular device to said External Trust Authority is performed after receiving an order for said particular device from a network operator.

14. A framework for updating identify data on a device, comprising:
a Key Generation System configured to generate a One Time Programmable Key;
a blackbox server configured to be loaded with said One Time Programmable Key, such that said One Time Programmable Key is available to be installed on a component;
a Whitelist Generator and Manager configured to request new identity data from an External Trust Authority by submitting said One Time Programmable Key to said External Trust Authority, receive said new identity data being encrypted with said One Time Programmable Key, and transmit said new identity data to said Key Generation System; and
an Update Server configured to receive said new identity data from said Key Generation System after said Key Generation System has validated said new identity data, such that said Update Server is loaded with said new identity data and provides said new identity data to a device that incorporates said component upon receiving a request for said new identity data from said device.

15. The framework of claim 14, where said Update Server is located at a device factory.

16. The framework of claim 14, wherein said Update Server is in communication with a network upon which said device is displayed.

17. A framework for updating identity data on a deice, comprising:
a Key Collector Server configured to collect a One Time Programmable Key installed onto a component;
a Key Generation System configured to receive said One Time Programmable Key from said Key Collector Server;
a Whitelist Generator and Manager configured to request new identity data from an External Trust Authority by submitting said One Time Programmable Key to said External Trust Authority, receive said new identity data from said External Trust Authority in encrypted form, said new identity data being encrypted with said One Time Programmable Key, and transmit said new identity data to said Key Generation System; and
an Update Server configured to receive said new identity data from said Key Genaration System after said Key Generation System has validated said new identity data, such that said Update Server is loaded with said new identity data and provides said new identity data to a device that incorporates said component upon receiving a request for said new identity data from said device.

18. A method for updating identity data on a device, comprising:
obtaining a component identifier and a One Time Programmable Key from a Key Collector Server at a component factory;
acQiuring a device comprising a component, said component beign associated with said component identifier and having a One Time Programmable Key installation on said component;
generating new identity data to said component identifier;
encrypting said new identity data with said One Time Programmable Key;
loading said new identity data onto an Update Server;
receiving a request at said Update Server from said device, said request requesting said new identity data; and
providing said new identity data to said device upon receipt of a said request, upon which said device decrypts and installs said identity data using said One Time Programmable Key installed on said component within said device.

* * * * *